United States Patent
Aronson et al.

(10) Patent No.: US 7,792,425 B2
(45) Date of Patent: Sep. 7, 2010

(54) NETWORK DATA TRANSMISSION AND DIAGNOSTIC METHODS USING OUT-OF-BAND DATA

(75) Inventors: Lew Aronson, Los Altos, CA (US); Lucy Hosking, Santa Cruz, CA (US); Marcin Matuszkiewicz, Waterloo (CA); Rudy Hofmeister, Escondido, CA (US)

(73) Assignee: Finisar Corporation, Sunnyvale, CA (US)

( * ) Notice: Subject to any disclaimer, the term of this patent is extended or adjusted under 35 U.S.C. 154(b) by 161 days.

(21) Appl. No.: 11/070,757

(22) Filed: Mar. 2, 2005

(65) Prior Publication Data
US 2005/0232635 A1  Oct. 20, 2005

Related U.S. Application Data

(63) Continuation of application No. 10/824,258, filed on Apr. 14, 2004.

(51) Int. Cl.
*H04B 10/00* (2006.01)
(52) U.S. Cl. .......... 398/30; 398/137; 398/138; 398/162
(58) Field of Classification Search .......... 398/135–139
See application file for complete search history.

(56) References Cited

U.S. PATENT DOCUMENTS

| | | | |
|---|---|---|---|
| 4,359,553 A | 11/1982 | Edwards | |
| 4,378,451 A | 3/1983 | Edwards | |
| 4,687,924 A | 8/1987 | Galvin et al. | |
| 4,734,914 A | 3/1988 | Yoshikawa | |
| 4,747,091 A | 5/1988 | Doi | |
| 4,763,326 A | 8/1988 | Krick | |
| 4,809,286 A | 2/1989 | Kollanyi et al. | |
| 4,916,707 A | 4/1990 | Rosenkranz | |
| 4,932,038 A | 6/1990 | Windus | |
| 4,949,333 A * | 8/1990 | Gulick et al. | 370/282 |
| 4,958,926 A | 9/1990 | Bu-Abbud | |
| 5,019,769 A | 5/1991 | Levinson | |
| 5,039,194 A | 8/1991 | Block et al. | |

(Continued)

FOREIGN PATENT DOCUMENTS

CN  200580011133.8  12/2009

(Continued)

OTHER PUBLICATIONS

Yi Cai et al., "Jitter testing for gigabit serial communication transceivers," Jan.-Feb. 2002, IEEE Design and Test of Computers, vol. 19, Issue 1, pp. 66-74.

(Continued)

*Primary Examiner*—Agustin Bello
(74) *Attorney, Agent, or Firm*—Workman Nydegger

(57) ABSTRACT

Out-of-band data communication of diagnostic and/or configuration data is performed using transceivers in a data or communication network. A light beam or other carrier is modulated with high-speed data and out-of-band diagnostic and/or configuration data to create a double modulated data signal. A physical layer signal is created that includes modulations of the double modulated signal. The physical layer signal is transmitted onto a physical link. The diagnostic and/or configuration data can be transmitted in the out-of-band signal without substantially reducing or otherwise interfering with the transmission rate of the high-speed data.

13 Claims, 16 Drawing Sheets

U.S. PATENT DOCUMENTS

| | | | |
|---|---|---|---|
| 5,041,491 A | 8/1991 | Turke et al. | |
| 5,047,835 A | 9/1991 | Chang | |
| 5,268,949 A | 12/1993 | Watanabe et al. | |
| 5,287,375 A | 2/1994 | Fujimoto | |
| 5,334,826 A | 8/1994 | Sato et al. | |
| 5,383,208 A | 1/1995 | Queniat et al. | |
| 5,392,273 A | 2/1995 | Masaki et al. | |
| 5,396,059 A | 3/1995 | Yeates | |
| 5,408,259 A | 4/1995 | Warwick | |
| 5,448,629 A | 9/1995 | Bosch et al. | |
| 5,516,563 A | 5/1996 | Schumann et al. | |
| 5,557,437 A | 9/1996 | Sakai et al. | |
| 5,574,435 A | 11/1996 | Mochizuki | |
| 5,576,877 A | 11/1996 | Aulet et al. | |
| 5,594,748 A | 1/1997 | Jabr | |
| 5,604,758 A | 2/1997 | AuYeung et al. | |
| 5,615,034 A * | 3/1997 | Hori | 398/158 |
| 5,654,816 A | 8/1997 | Fishman | |
| 5,673,282 A | 9/1997 | Wurst | |
| 5,748,672 A | 5/1998 | Smith et al. | |
| 5,761,216 A | 6/1998 | Sotome et al. | |
| 5,801,866 A | 9/1998 | Chan et al. | |
| 5,812,572 A | 9/1998 | King et al. | |
| 5,854,704 A | 12/1998 | Grandpierre | |
| 5,926,303 A | 7/1999 | Giebel et al. | |
| 5,953,690 A | 9/1999 | Lemon et al. | |
| 5,956,168 A | 9/1999 | Levinson et al. | |
| 5,966,395 A | 10/1999 | Ikeda | |
| 6,031,645 A | 2/2000 | Ichikawa | |
| 6,049,413 A | 4/2000 | Taylor | |
| 6,055,252 A | 4/2000 | Zhang | |
| 6,064,501 A | 5/2000 | Roberts et al. | |
| 6,091,738 A * | 7/2000 | Tsujikado et al. | 370/453 |
| 6,157,022 A | 12/2000 | Maeda et al. | |
| 6,160,647 A | 12/2000 | Gilliland et al. | |
| 6,175,434 B1 | 1/2001 | Feng | |
| 6,188,059 B1 | 2/2001 | Nishlyama et al. | |
| 6,198,558 B1 | 3/2001 | Graves et al. | |
| 6,205,505 B1 | 3/2001 | Jau et al. | |
| 6,222,660 B1 | 4/2001 | Traa | |
| 6,229,631 B1 * | 5/2001 | Sato et al. | 398/30 |
| 6,229,788 B1 | 5/2001 | Graves et al. | |
| 6,256,127 B1 | 7/2001 | Taylor | |
| 6,292,497 B1 | 9/2001 | Nakano | |
| 6,313,459 B1 | 11/2001 | Hoffe et al. | |
| 6,366,373 B1 * | 4/2002 | MacKinnon et al. | 398/31 |
| 6,423,963 B1 | 7/2002 | Wu | |
| 6,473,224 B2 | 10/2002 | Dugan et al. | |
| 6,512,617 B1 | 1/2003 | Tanji et al. | |
| 6,519,255 B1 | 2/2003 | Graves | |
| 6,526,076 B2 | 2/2003 | Cham et al. | |
| 6,570,149 B2 | 5/2003 | Maruyama et al. | |
| 6,594,043 B1 * | 7/2003 | Bloom et al. | 398/15 |
| 6,594,050 B2 | 7/2003 | Jannson et al. | |
| 6,631,146 B2 | 10/2003 | Pontis et al. | |
| 6,643,472 B1 | 11/2003 | Sakamoto et al. | |
| 6,661,836 B1 | 12/2003 | Dalal et al. | |
| 6,694,462 B1 | 2/2004 | Reiss et al. | |
| 6,748,181 B2 | 6/2004 | Miki et al. | |
| 6,937,949 B1 | 8/2005 | Fishman et al. | |
| 6,941,077 B2 | 9/2005 | Aronson et al. | |
| 6,952,531 B2 | 10/2005 | Aronson et al. | |
| 7,020,567 B2 | 3/2006 | Fishman et al. | |
| 7,058,310 B2 | 6/2006 | Aronson et al. | |
| 2001/0046242 A1 | 11/2001 | Kawakami et al. | |
| 2001/0046243 A1 | 11/2001 | Schie | |
| 2002/0021468 A1 | 2/2002 | Kato et al. | |
| 2002/0027688 A1 | 3/2002 | Stephenson | |
| 2002/0060824 A1 | 5/2002 | Liou et al. | |
| 2002/0097468 A1 | 7/2002 | Mecherle et al. | |
| 2002/0101641 A1 | 8/2002 | Kurchuk | |
| 2002/0105982 A1 | 8/2002 | Chin et al. | |
| 2002/0129379 A1 | 9/2002 | Levinson et al. | |
| 2002/0149821 A1 | 10/2002 | Aronson et al. | |
| 2002/0181519 A1 | 12/2002 | Vilhelmsson et al. | |
| 2002/0181894 A1 | 12/2002 | Gilliland et al. | |
| 2003/0053170 A1 | 3/2003 | Levinson et al. | |
| 2003/0110509 A1 | 6/2003 | Levinson et al. | |
| 2003/0113118 A1 | 6/2003 | Bartur | |
| 2003/0169790 A1 | 9/2003 | Chieng et al. | |
| 2003/0210917 A1 | 11/2003 | Stewart et al. | |
| 2003/0223761 A1 * | 12/2003 | Brown et al. | 398/183 |
| 2004/0076113 A1 | 4/2004 | Aronson et al. | |
| 2004/0109696 A1 | 6/2004 | Toshihisa | |
| 2004/0120720 A1 | 6/2004 | Chang et al. | |
| 2004/0153913 A1 | 8/2004 | Fishman et al. | |
| 2004/0202210 A1 | 10/2004 | Thornton | |
| 2004/0208520 A1 * | 10/2004 | Palacharla et al. | 398/30 |
| 2004/0240886 A1 | 12/2004 | Aronson et al. | |
| 2004/0253003 A1 | 12/2004 | Farmer et al. | |
| 2005/0031352 A1 | 2/2005 | Light et al. | |
| 2005/0058455 A1 | 3/2005 | Aronson et al. | |
| 2005/0213621 A1 * | 9/2005 | Varga et al. | 372/38.02 |

FOREIGN PATENT DOCUMENTS

| | | |
|---|---|---|
| EP | 0745868 B1 | 4/2002 |
| EP | 02704344 | 10/2004 |
| EP | 04017254 | 10/2004 |
| EP | 1471671 A2 | 12/2004 |
| JP | 57075042 | 5/1982 |
| JP | 58140175 A | 8/1983 |
| JP | 62124576 A | 6/1987 |
| JP | 62-247639 | 10/1987 |
| JP | 62235975 A | 10/1987 |
| JP | 62281485 A | 12/1987 |
| JP | 402102589 A | 4/1990 |
| JP | 404023373 A | 1/1992 |
| JP | 06209209 A | 7/1994 |
| JP | 07-135486 | 5/1995 |
| JP | 08317361 | 11/1996 |
| JP | 09162811 A | 6/1997 |
| JP | 11135871 | 5/1999 |
| JP | 2007-508648 | 12/2009 |
| WO | 91/09478 | 6/1991 |
| WO | WO 98/00893 | 1/1998 |
| WO | WO 98/00943 | 8/1998 |
| WO | PCT/US02/03226 | 5/2002 |
| WO | WO 02/063800 A1 | 8/2002 |
| WO | 2004/013979 | 2/2004 |
| WO | 2004013991 | 2/2004 |
| WO | WO/2004/098100 | 11/2004 |

OTHER PUBLICATIONS

Maeda, Noriyuki "Notification of Reason(s) for Refusal," Japanese Patent Application No. JP2002-563630, Nakamura, M. et al., Jul. 13, 2005.

Finisar Corp., "App. Note AN-2025: Using the Finisar GBIC I$^2$C Test Diagnostics Port," 1998.

Hausdorf, Reiner, "Mobile Transceiver Measurements with Radiocommunication Service Monitor CMS," News from Rohde & Schwarz, 127, IV, 1989, pp. 4-7.

Webopedia: The 7 Layers of the OSI Model [online] [retrieved Oct. 15, 2003]. Retrieved from Internet: URL: http://webopedia.internet.com/quick_ref/OST_Layers.asp.

Manchester Encoding [online] [retrieved Nov. 12, 2003]. Retrieved from Internet: URL: http://www.erg.abdn.ac.uk/users/gorry/course/phy-pages/man.html.

Documentation entitled "IR Receiver ASSP: T2525", copyright 2003 by Atmel Corporation.

Documentation entitled "IR Receiver for Data Communication: U2538B", copyright 2003 by Atmel Corporation.

Documentation entitled "Low-Voltage Highly Selective IR Receiver IC: T2527", copyright 2002 by Atmel Corporation.

Documentation entitled "Application Note: T2525/26/27", copyright 2003 by Atmel Corporation.

*Optiport SFF BiDi-Transceiver 100 Mbit/s, 1310 nm Tx/1550 nm Rx*, Infineon Technologies, Jun. 22, 2004, pp. 1-14.

*LXT16706/16707 SerDes Chipset*, Intel Products, www.intel.com/design/network/products/optical/phys/1xt16706.htm, Apr. 19, 2002.

*LXT35401 XAUI-to-Quad 3.2G Transceiver*, Intel Products, www.intel.com/design/network/products/optical/phys/1xt35401.htm, Apr. 19, 2002.

Texas Instruments User's Guide, *TLK2201 Serdes EVM Kit Setup and Usage*, Mixed Signal DSP Solutions, Jul. 2000.

Texas Instruments User's Guide, *TLK1501 Serdes EVM Kit Setup and Usage*, Mixed Signal Products, Jun. 2000.

National Semiconductor DS92LV16 Design Guide, *Serializing Made Simple*, Feb. 2002.

Vaishali Semiconductor, *Fibre Channel Transceiver*, VN16117, MDSN-0002-02, Aug. 9, 2001.

Fairchild Semiconductor, Application Note 77, *CMOS, the Ideal Logic Family*, Jan. 1983.

Analog Target Specification, Annex 48B, Published by IEEE New York, May 2001, pp. 6-14.

Webopedia: The 7 Layers of the OSI Model [online] [retrieved Oct. 15, 2003]. Retrieved from Internet: URL: http://webopedia.internet.com/quick_ref/OSI_Layers.asp.

Manchester Encoding [online] [retrieved Nov. 12, 2003]. Retrieved from Internet: URL: http://www.erg.abdn.ac.uk/users/gorry/course/phy-pages/man.html.

Documentation entitled "IR Receiver ASSP: T2525", copywrite 2003 by Atmel Corporation.

Documentation entitled "IR Receiver for Data Communication: U2538B", copywrite 2003 by Atmel Corporation.

Documentation entitled "Low-Voltage Highly Selective IR Receiver IC: T2527", copywrite 2002 by Atmel Corporation.

Documentation entitled "Application Note: T2525/26/27", copywrite 2003 by Atmel Corporation.

Office Action mailed May 19, 2008, U.S. Appl. No. 10/824,258.

U.S. Appl. No. 10/824,258, Mail Date Jan. 11, 2007, Office Action.

U.S. Appl. No. 10/824,258, Mail Date Aug. 15, 2007, Office Action.

U.S. Appl. No. 10/824,258, Mail Date Dec. 9, 2008, Office Action.

Infrared Remote Control Decoder, Philips Semiconductor, Sep. 13, 1996, pp. 1-16.

Infrared Remote Control Decoder, Philips Semiconductor, Sep. 13, 1996, pp. 1-16.

U.S. Appl. No. 10/824,258, Mail Date Jan. 4, 2008, Notice of Allowance.

U.S. Appl. No. 10/824,258, Mail Date May 6, 2009, Notice of Allowance.

U.S. Appl. No. 10/824,258, Mail Date Jul. 27, 2009, Notice of Allowance.

EP 05 73 8397.8 Supplementary European Search Report dated Jan. 27, 2010.

Maciocco C et al: Photonic burst switching (pbs) architecture for hop and span-constrained optical networks IEEE Communications Magazine, IEEE Service Center, Piscataway, US, vol. 41, No. 11, Nov. 1, 2003, pp. 58-66, XPOII103252.

* cited by examiner

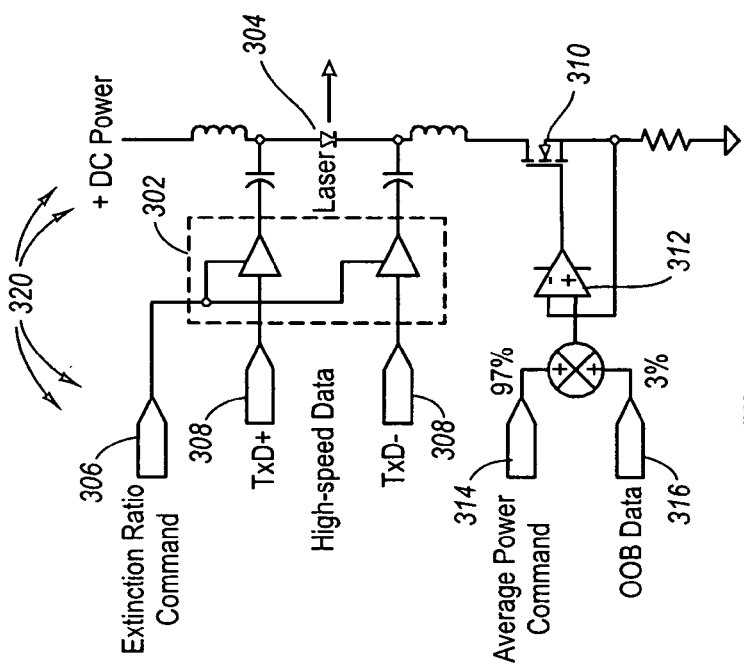
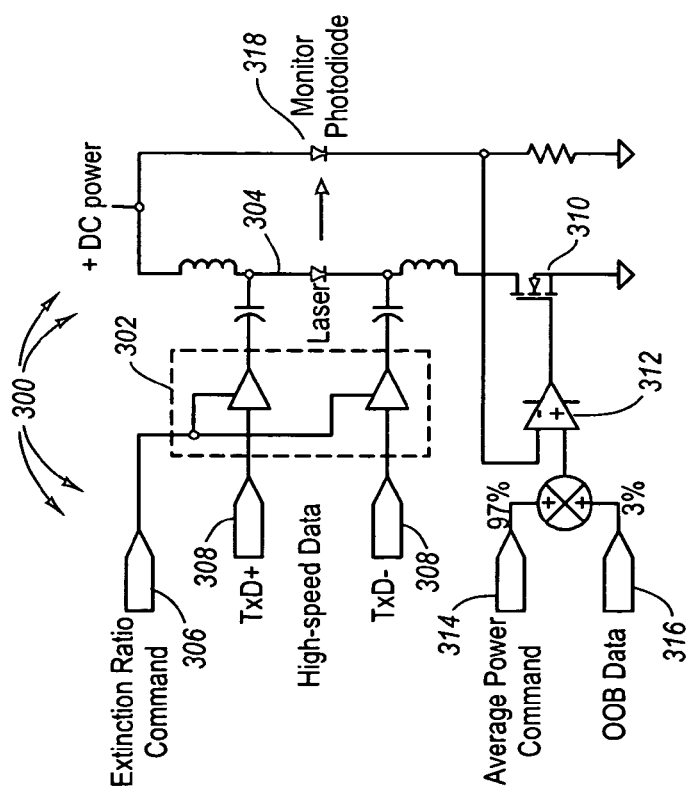
Fig. 3B
Fig. 3A

NETWORK DATA TRANSMISSION AND DIAGNOSTIC METHODS USING OUT-OF-BAND DATA

CROSS-REFERENCE TO RELATED APPLICATIONS

This application is a continuation of U.S. application Ser. No. 10/824,258, titled Out-of-Band Data Communication Between Network Transceivers filed Apr. 14, 2004, which is incorporated herein by reference.

BACKGROUND OF THE INVENTION

1. The Field of the Invention

The invention generally relates to the field of data transmission in communication networks. More specifically, the invention relates to simultaneous transmission of high-speed data and out-of-band configuration and diagnostic data.

2. Description of the Related Art

Modern day communication is, in large part, accomplished by transmitting and receiving large amounts of digital data. Digital data signals can be used to transmit information such as database information, financial information, personal and business information, and the like. In addition, digital data signals can be used to transmit voice, video, images etc.

Commonly, digital communication is accomplished using a model known as the Open Systems Interconnection (OSI) model. The OSI model defines a framework for accomplishing digital communications with seven layers on clients communicating in a network. These seven layers are understood by those of skill in the art, and include from the highest level to the lowest level: the application layer, the presentation layer, the session layer, the transport layer, the network layer, the data link layer, and the physical layer. At the application layer, data is used in end user processes. Data is packaged by each of the other layers of the OSI model prior to being sent using the physical layer. The physical layer defines how the data is actually sent on the network, such as by electrical signals, light carried on optical fibers, radio signals etc. Thus, at the physical layer, actual voltages, light levels and radio amplitudes or frequencies are defined as having certain logical values.

At the physical layer, one method of communicating digital data involves the use of transceivers. A transceiver includes a signal power source including electronic hardware for transmitting data signals along a physical link such as a copper wire link or fiber-optic link. The signal power source may be a laser, electronic amplifier, radio transmitter and the like. The transceiver may also include a physical layer signal reception element to receive physical layer signals. The physical layer reception element may be a photodiode, an electronic amplifier, a radio receiver, or the like.

The transceiver may include electronic hardware for decoding signals that are sent between clients into data signals, such as binary representations, readable by digital devices or hosts, to which the transceiver is connected. The transceiver may also include electronic hardware for encoding signals that are sent between clients from a binary representation to a physical layer level signal that can be transmitted across a physical link. Thus, in one example, a binary representation is converted to one of a modulated electronic signal, a modulated optical signal, a modulated radio signal or another appropriate signal.

Each transceiver is generally passive with respect to other transceivers. This means that a transceiver simply sends and receives digital data that has been converted to a physical layer level signal without extracting or processing the information represented by the digital data. In other words, transceivers do not generally communicate data to one another for the benefit of the transceivers. Instead, the transceivers communicate data to one another for the benefit of the hosts to which the transceivers are connected.

A transceiver may communicate data for the benefit of the transceiver to the connected host device. For example, a transceiver may be configured to generate digital diagnostic information by monitoring the health of the transceiver. The transceiver may then communicate information about the health of the transceiver to its connected host. This communication typically takes place on an $I^2C$ or MDIO bus for communicating between integrated circuits. As a transceiver deteriorates due to age, component failure or other reasons, the host may be aware of the deterioration using such communications received from the transceiver.

Digital diagnostics logic (also referred to herein as "digital diagnostics") may be used to handle various tasks and to generate monitoring and operating data. These task and data may include some of the following:

Setup functions. These generally relate to the required adjustments made on a part-to-part basis in the factory to allow for variations in component characteristics such as laser diode threshold current.

Identification. This refers to general purpose memory, typically EEPROM (electrically erasable and programmable read only memory) or other nonvolatile memory. The memory may be accessible using a serial communication standard, that is used to store various information identifying the transceiver type, capability, serial number, and compatibility with various standards. While not standard, this memory may also store additional information, such as sub-component revisions and factory test data.

Eye safety and general fault detection. These functions are used to identify abnormal and potentially unsafe operating parameters and to report these to the host and/or perform laser shutdown, as appropriate.

Temperature compensation functions. For example, compensating for known temperature variations in key laser characteristics such as slope efficiency.

Monitoring functions. Monitoring various parameters related to the transceiver operating characteristics and environment. Examples of parameters that may be monitored include laser bias current, laser output power, receiver power levels, supply voltage and temperature. Ideally, these parameters are monitored and reported to, or made available to, a host device and thus to the user of the transceiver.

Power on time. The transceiver's control circuitry may keep track of the total number of hours the transceiver has been in the power on state, and report or make this time value available to a host device.

Margining. "Margining" is a mechanism that allows the end user to test the transceiver's performance at a known deviation from ideal operating conditions, generally by scaling the control signals used to drive the transceiver's active components.

Other digital signals. A host device may configure the transceiver so as to make it compatible with various requirements for the polarity and output types of digital inputs and outputs. For instance, digital inputs are used for transmitter disable and rate selection functions while outputs are used to indicate transmitter fault and loss of signal conditions. The configuration values determine the polarity of one or more of the binary input and output signals. In some transceivers, these configuration values can be used to specify the scale of one or more of the digital input or output values, for instance by specifying a scaling factor to be used in conjunction with the digital input or output value.

The data generated by the digital diagnostics described above is generally only available to the host on which a transceiver is installed. Thus, when troubleshooting problems with individual transceivers, a user needs to access the host on which the transceiver is installed to discover any digital diagnostic data about a transceiver. This may cause various difficulties when the host and transceiver are located in a remote location such as on the ocean floor or in remote desert locations. Further, some applications make use of repeaters, which are transceiver pairs that simply receive an optical data stream, amplify the optical data stream, and retransmit the optical data stream. In repeater applications, the digital diagnostic data is stored on the repeater. Thus to troubleshoot the repeater, the repeater, in this example, is physically retrieved and queried for any digital diagnostic data.

Some protocols exist where digital diagnostic data can be sent as part of the high-speed data sent on an optical link. However, this generally involves sending the data in some specially defined packet or portion of a packet. Thus to retrieve the digital diagnostic data, the high-speed data is disassembled such as by a framer, the digital diagnostic data extracted, and the high-speed data reassembled. Additionally, if digital diagnostic data is to be added by a transceiver in a chain of transceivers, the high-speed data is disassembled and the digital diagnostic data added in the appropriate portion of the high-speed data, and the high-speed data, including the digital diagnostic data, reassembled. To disassemble and reassemble a high-speed data signal represents a significant and unwanted cost in terms of data processing. Additionally, there are time delays as the data is disassembled and reassembled prior to retransmission of the data from link to link.

In other presently existing systems, the digital diagnostic data may be sent in a high-speed data signal that includes multiple channels where one of the channels is reserved for high-speed data. This implementation cannot be used in single channel systems. Further, the use of a channel for diagnostic data reduces the amount of other high-speed data that can be transmitted. Also, the cost of disassembling and reassembling the high-speed data signal remains as the channel with the digital diagnostic data is extracted from the high-speed data signal to obtain the digital diagnostic data and re-added to the high-speed data signal when the high-speed data signal is passed to other links in a network.

Another challenge that arises with transceivers presently in the art relates to negotiating data rates along a channel. Communication at the physical layer includes protocols that specify, among other things, the data rate at which communication may be accomplished. Some protocols have variable communication data rates. This may be useful as the quality of the links between hosts vary. A lower quality link often requires lower data rates to avoid errors. Additionally, data rates may be faster on later produced devices as technology advances. A protocol that allows for different data rates is the Fibre Channel protocol that supports data rates of 1, 2 and 4 Gigabits/second. Typically, a link between two devices requires that the device communicate at the same data rate. Where devices are capable of communicating at different data rates, the devices, such as host devices, negotiate the data rate at which communications will occur. Presently existing negotiation protocols are complex and may require inordinate amounts of network and computing resources to properly negotiate a data rate.

BRIEF SUMMARY OF THE INVENTION

Embodiments of the present invention relate to transceivers having a signal power source, such as a laser driver and laser, which is configured to produce a physical link signal, such as an optical signal, for transmission across a physical link, such as a fiber optic cable. These transceivers also include a high-speed data modulator connected to the signal power source. An out-of-band data modulator is also connected to the signal power source. The signal power source creates an outgoing double modulated signal in response to the high-speed data modulation and out-of-band data modulation. The outgoing double modulated signal includes high-speed data and out-of-band diagnostic and/or configuration data.

Other embodiments of the invention relate to methods of transmitting data on a physical link. Such methods include modulating a signal with high-speed data and out-of-band diagnostic and/or configuration data to create a double modulated data signal. The double modulated signal is a physical layer signal for transmission on a physical link. The physical layer signal, which includes modulations of the outgoing double modulated signal, is transmitted onto the physical link.

Still other embodiments relate to a receiver that receives diagnostic and/or configuration data. The receiver includes a signal reception element configured to receive a physical layer signal from a physical link. An out-of-band detector is connected to the signal reception element. The out-of-band detector extracts out-of-band diagnostic and/or data detector for receiving the out-of-band diagnostic and/or configuration data. An amplifier is connected to the signal reception element. The high-speed data amplifier is configured to receive high-speed data.

In this manner, embodiments of the invention enable out-of-band data to be transmitted simultaneously with high-speed data on the high-speed data physical link. This may allow for monitoring transceiver health, remotely configuring transceivers, authenticating transceivers etc.

These and other advantages and features of the present invention will become more fully apparent from the following description and appended claims, or may be learned by the practice of the invention as set forth hereinafter.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 3A illustrates an apparatus for modulating out-of-band data onto the average power of a high-speed data signal, where the apparatus includes feedback from a monitor photodiode;

FIG. 3B illustrates an apparatus for modulating out-of-band data onto the average power of a high-speed data signal;

DETAILED DESCRIPTION OF THE INVENTION

Embodiments of the present invention include systems and methods for modulating high-speed data and out-of-band data as a double modulated signal. The double modulated signal is transmitted on a physical link between components in a network of connected hosts. Thus, high-speed data that is ordinarily transmitted on a physical link can be transmitted with out-of-band data on the same physical link. This allows for the transmission of information such as diagnostic information, authentication information, rate negotiation information, configuration information etc.

The term "high-speed data," as used herein, does not refer to any particular defined bandwidth or frequency of data. Rather, high-speed data refers to data typically transmitted on a network such as the data typically transmitted for the benefit of the various hosts on a network. High-speed data may also be referred herein as in-band data which is a reference to the communication band typically used by host systems to communicate data. High-speed and in-band data are distinguished from out-of-band data which is typically used to transmit data from transceiver to transceiver for the use of the transceivers. While a host may subsequently receive the out-of-band data, the host usually receives the out-of-band data from a transceiver through a low speed bus such as an $I^2C$ or MDIO bus. This is contrasted to high-speed data which is typically received by a host from a transceiver through some type of high-speed data interface. Notably, a host may also produce the out-of-band data and transmit the out-of-band data to a transceiver on a low speed bus.

Figure 1:
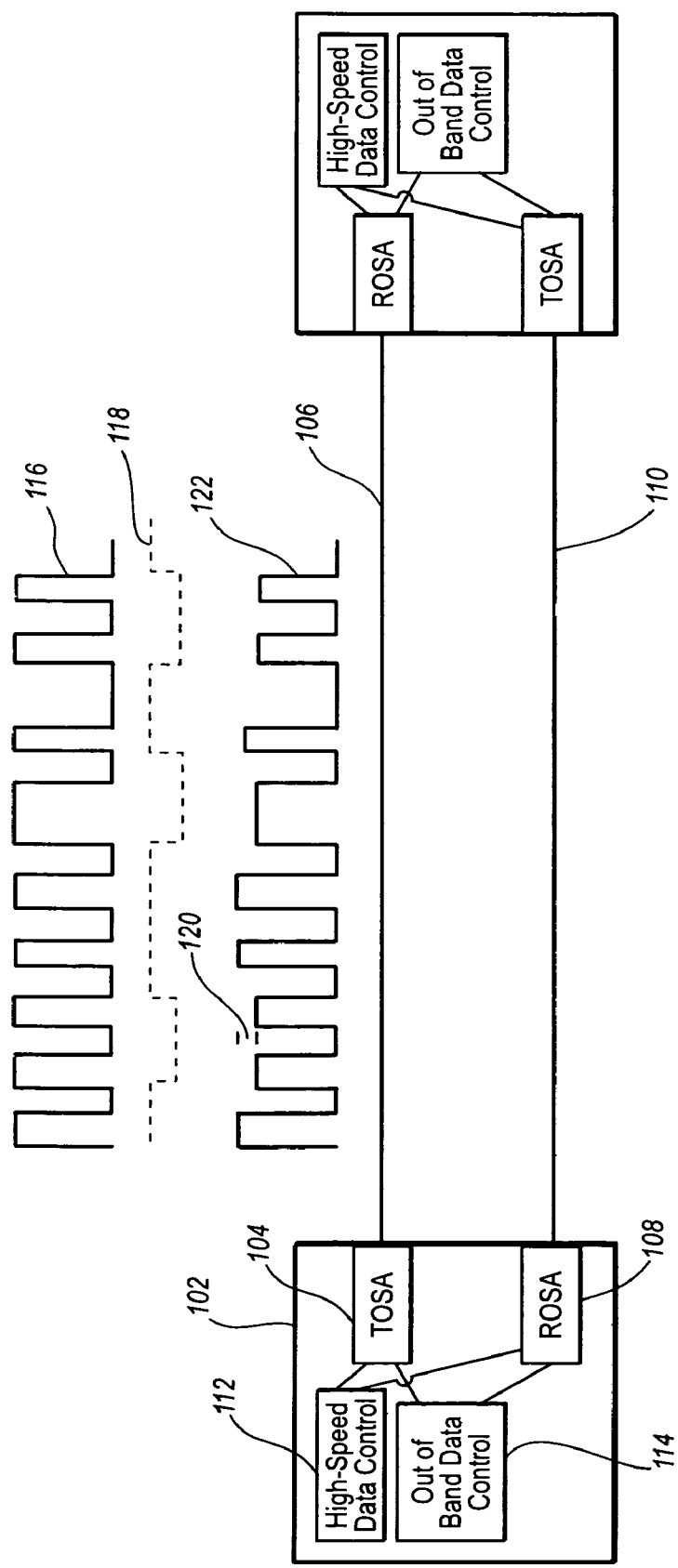
FIG. 1 illustrates a connection between two host devices for communicating high-speed and out-of-band data.

Referring now to FIG. 1, an embodiment of the invention that encodes out-of-band data by modulating a high-speed data signal is shown. FIG. 1 shows a host device 102 for use in fiber optic communications. The host device includes a transmitter optical subassembly (TOSA) 104 for transmitting signals across a physical link 106. The host device 102 also includes a receiver optical subassembly (ROSA) 108 for receiving optical signals across a physical link 110. The TOSA 104 is connected to a high-speed data control 112, which may include a high-speed modulator that modulates the power output of a signal power source such as a laser in the TOSA 104 such that the high-speed data is converted to a form that can be transmitted across the physical link 106. As shown in FIG. 1, the high-speed data control 112 modulates the TOSA 104 to produce a high-speed physical layer data signal 116. Also connected to the TOSA 104 is an out-of-band data control 114. The out-of-band data control 114 further modulates the laser in the TOSA 104 using an out-of-band data modulator such that an out-of-band data stream 118 is modulated onto the high-speed data signal 116 to produce an outgoing double modulated signal 122 that includes high-speed and out-of-band data.

In the example shown, the modulations of the out-of-band data appear as a change in peak power 120 of the outgoing double modulated signal 122. Thus the outgoing double modulated signal 122 includes both high-speed data and out-of-band data. The out-of-band data may be modulated using a number of different modulation techniques including but not limited to phase shift keying, binary phase shift keying, quadrature phase shift keying, and Manchester encoding. The out-of-band data may actually have a frequency range that is orders of magnitude less than the in-band data. However, to illustrate the principle of double modulation in a simple graphical form, the frequency of the out-of-band data stream 118 is illustrated in FIG. 1 as having only a slightly lower frequency than the high-speed data signal 116. Regardless, the principles of the present invention are not limited to the relative frequency between the out-of-band data stream 118 and the high-speed data signal 116.

To perform receiving functions, the ROSA 108 includes a signal reception element such as a photodiode that receives an incoming double modulated signal. The ROSA 108 sends all or portions of the incoming double modulated signal to the out-of-band data control 114 and the high-speed data control 112. The out-of-band data control 114 may include an out-of-band detector that extracts the out-of-band data from the incoming double modulated signal. The high-speed data control 112 may include a high-speed data amplifier that extracts high-speed data from the incoming double modulated signal.

Figure 2A:
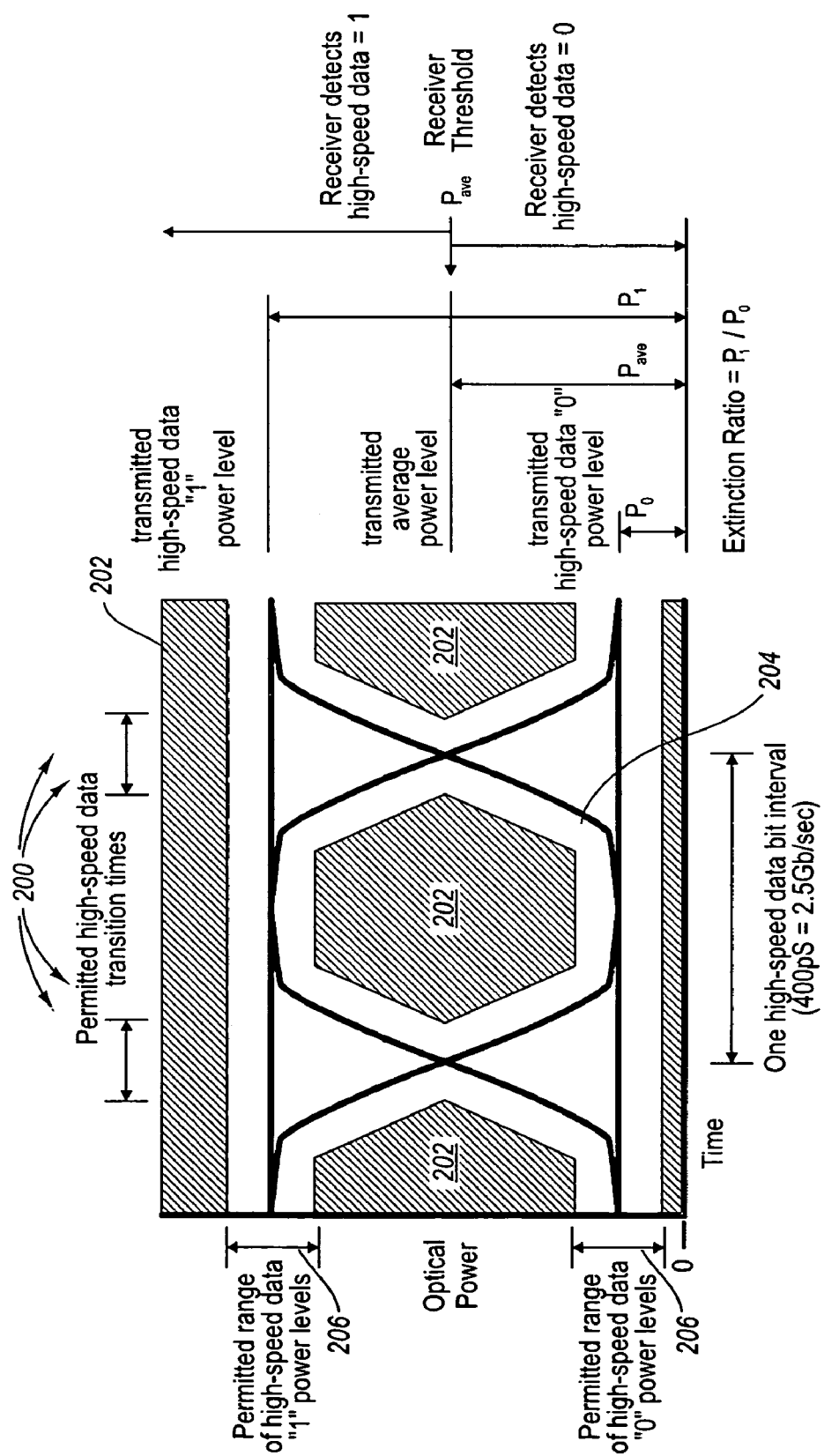
FIG. 2A illustrates an eye diagram showing channel margins that may be used to modulate out-of-band data onto a high-speed data signal while still maintaining an appropriate extinction ratio.

Referring now to FIG. 2A principles of embodiments of the present invention may be understood in reference to an eye diagram 200. The eye diagram 200 is a graphical representation of signal quality formed by the superposition of multiple bits of data. The eye diagram 200 includes shaded regions which are forbidden zones 202. If the boundary of a bit falls within the forbidden zones 202, that bit will be interpreted as an error. Thus data transmitted across a physical link should be transmitted so that the data does not fall within the forbidden zones 202. Certain specifications require that only a limited number of bits be interpreted as errors. This is usually expressed as a required bit error rate (BER). The BER can be described or quantified based on the eye diagram. The appropriate BERs may be expressed in a communications standard, such as the 10 Gigabit Ethernet standard, which specifies BERs no greater that $10^{-12}$.

Bit error rates may also be specified by customer expectations or requirements. Often the BER required by customers purchasing communication equipment exceeds the BER specified by a particular communication standard. The BER is a function of the extinction ratio and the average power ($P_{ave}$ in FIG. 2A) received by a transceiver. Physical layer specifications often specify BER as a minimum and maximum extinction ration. The extinction ratio is the ratio of the power level received by a transceiver when a "1" high-speed bit is transmitted ($P_1$ in FIG. 2A) to the power level received by a transceiver when a "0" high-speed bit is transmitted ($P_0$ in FIG. 2A). Thus, the extinction ratio is expressed as $P_1/P_0$. A particular extinction ratio will cause a sufficient number of high-speed bits to fall within a bit margin 204 that is outside of the forbidden zone 202 to achieve a required BER.

Also shown in FIG. 2A, is a channel margin 206 that defines power levels where high-speed data bits can still exist and not be interpreted as errors. The channel margin 206 may facilitate embedding out-of-band data onto a high-speed data signal.

Figure 2B:
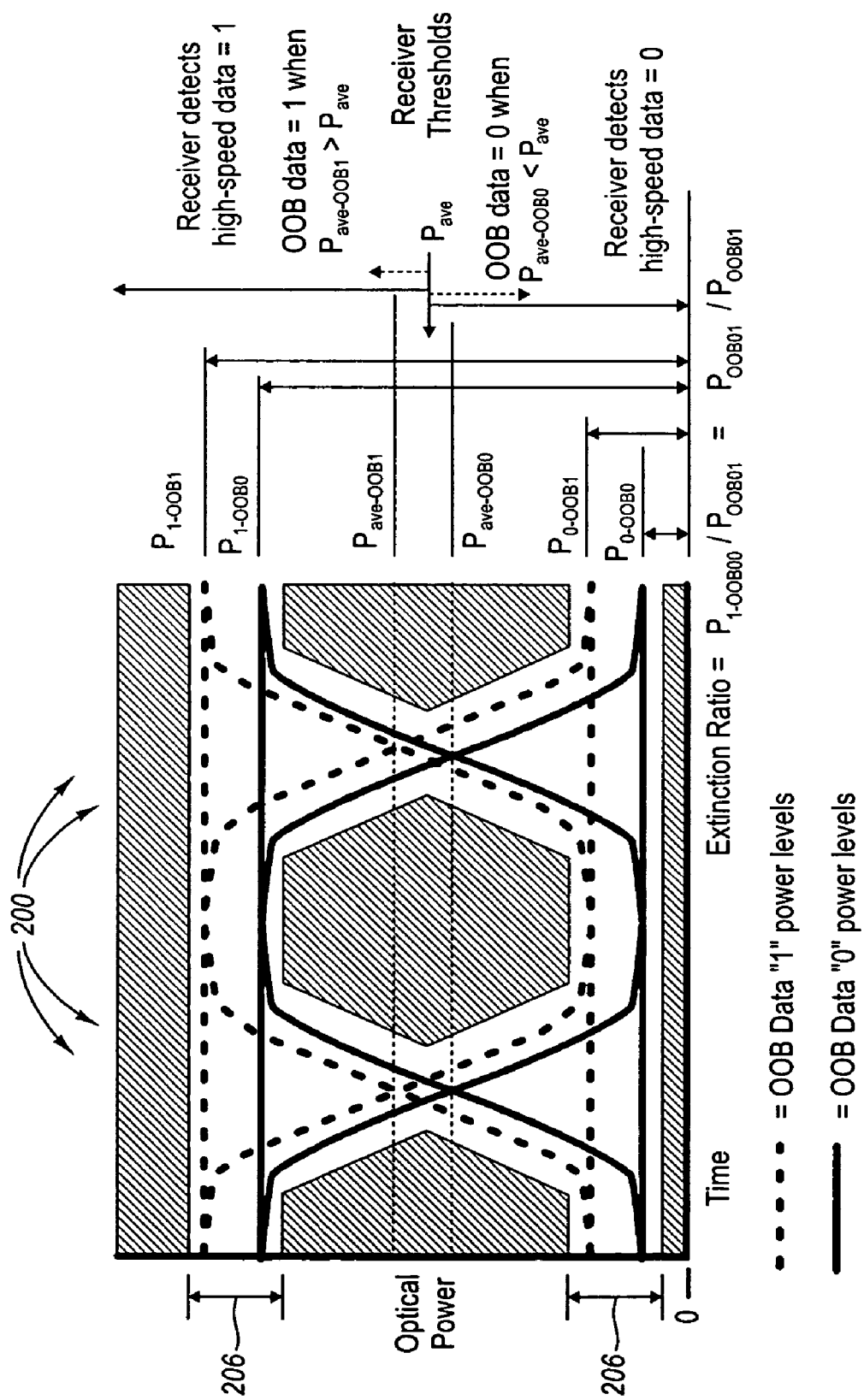
FIG. 2B illustrates an eye diagram showing out-of-band data modulated using an average power setting of a transmitter.

In one embodiment of the invention, the out-of-band data may be embedded onto the high-speed data by modulating the average power of the high-speed bits transmitted. This example is illustrated by the eye diagram in FIG. 2B. The eye diagram is modulated within the channel margins 206. In FIG. 2B, the eye diagram has the same extinction ratio whether a "0" out-of-band data bit or a "1" out-of-band data bit is being transmitted. In other words, $P_{1\text{-}OOB0}/P_{0\text{-}OOB0}=P_{1\text{-}OOB1}/P_{0\text{-}OOB1}$ where $P_{1\text{-}OOB0}$ is the power transmitted with a "1" high-speed bit and a "0" out-of-band bit, $P_{0\text{-}OOB0}$ is the power transmitted with a "0" high-speed bit and a "0" out-of-band bit, $P_{1\text{-}OOB1}$ is the power transmitted with a "1" high-speed bit and a "1" out-of-band bit and $P_{0\text{-}OOB1}$ is the power transmitted with a "0" high-speed bit and a "1" out-of-band bit. Thus, an appropriate BER can be maintained while modulating the out-of-band data onto the high-speed data.

Figure 2C:
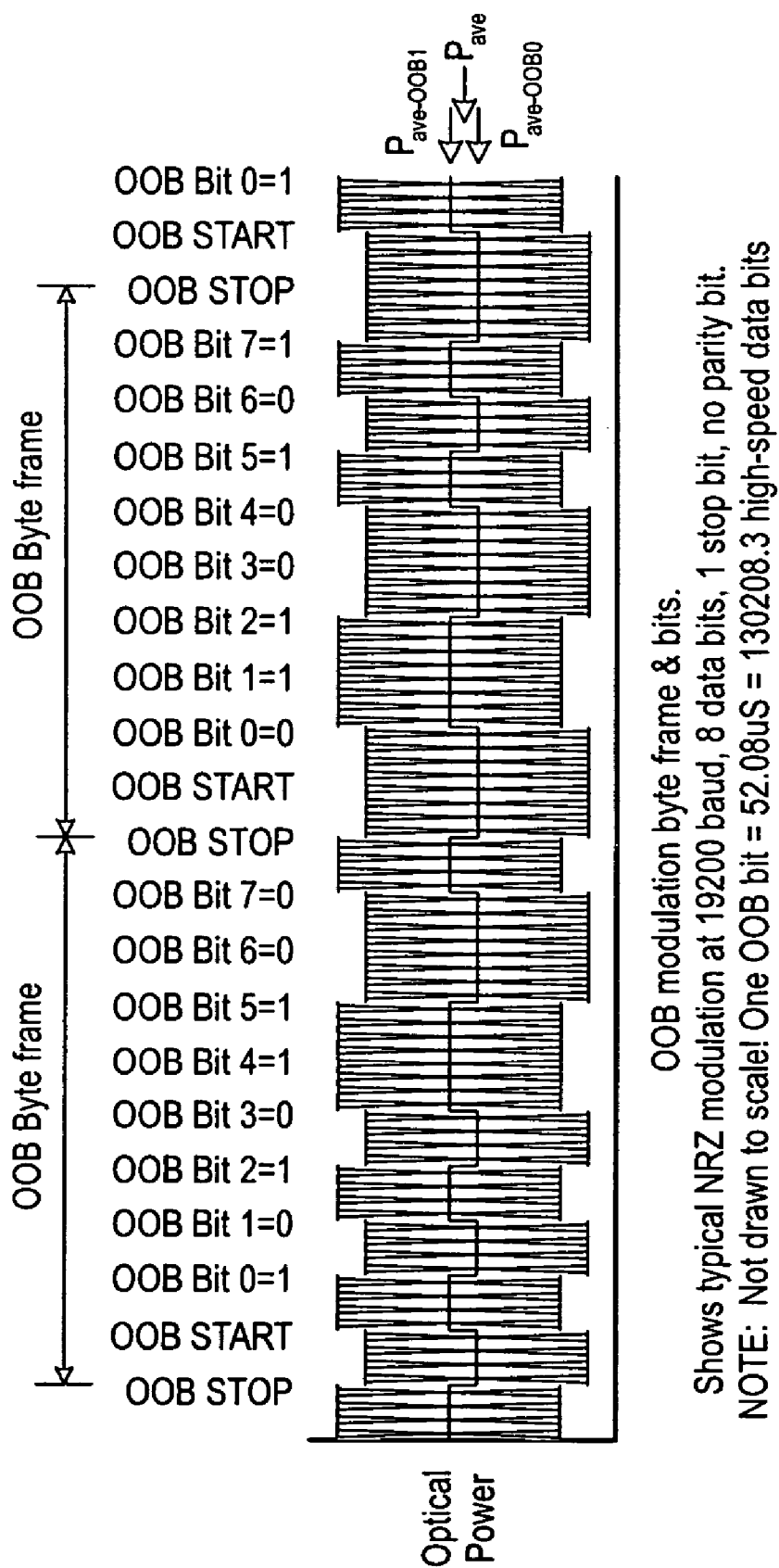
FIG. 2C illustrates a high-speed data signal modulated with out-of-band data where the out-of-band data is modulated on the average power of the high-speed data signal.

Illustratively, FIG. 2C shows an out-of-band bit stream modulated onto a high-speed bit stream. Notably, the bit streams in FIG. 2C are not drawn to scale. Typically, an out-of-band bit stream, in the embodiment shown, may be NRZ modulation at 19200 baud, whereas the high-speed data is at 2.5 Gbits/s. In this example, this results in about 130,000 high-speed bits per out-of-band bit. Thus, for clarity, FIG. 2C is not drawn to scale. FIG. 2C shows the average power of an optical signal modulated according to an out-of-band bit stream.

Figure 2D:
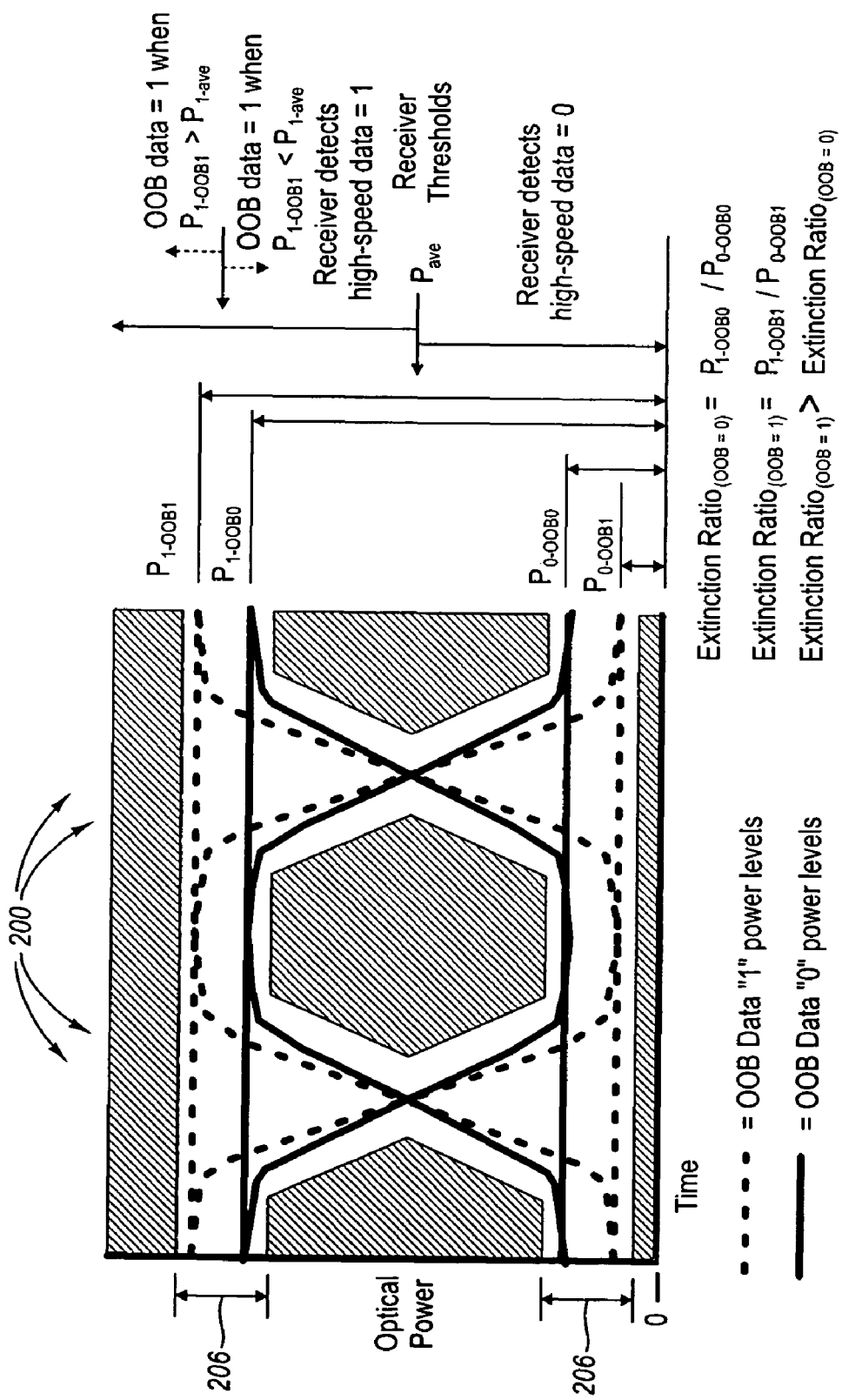
FIG. 2D illustrates an eye diagram showing out-of-band data modulated using an extinction ratio.
Figure 2E:
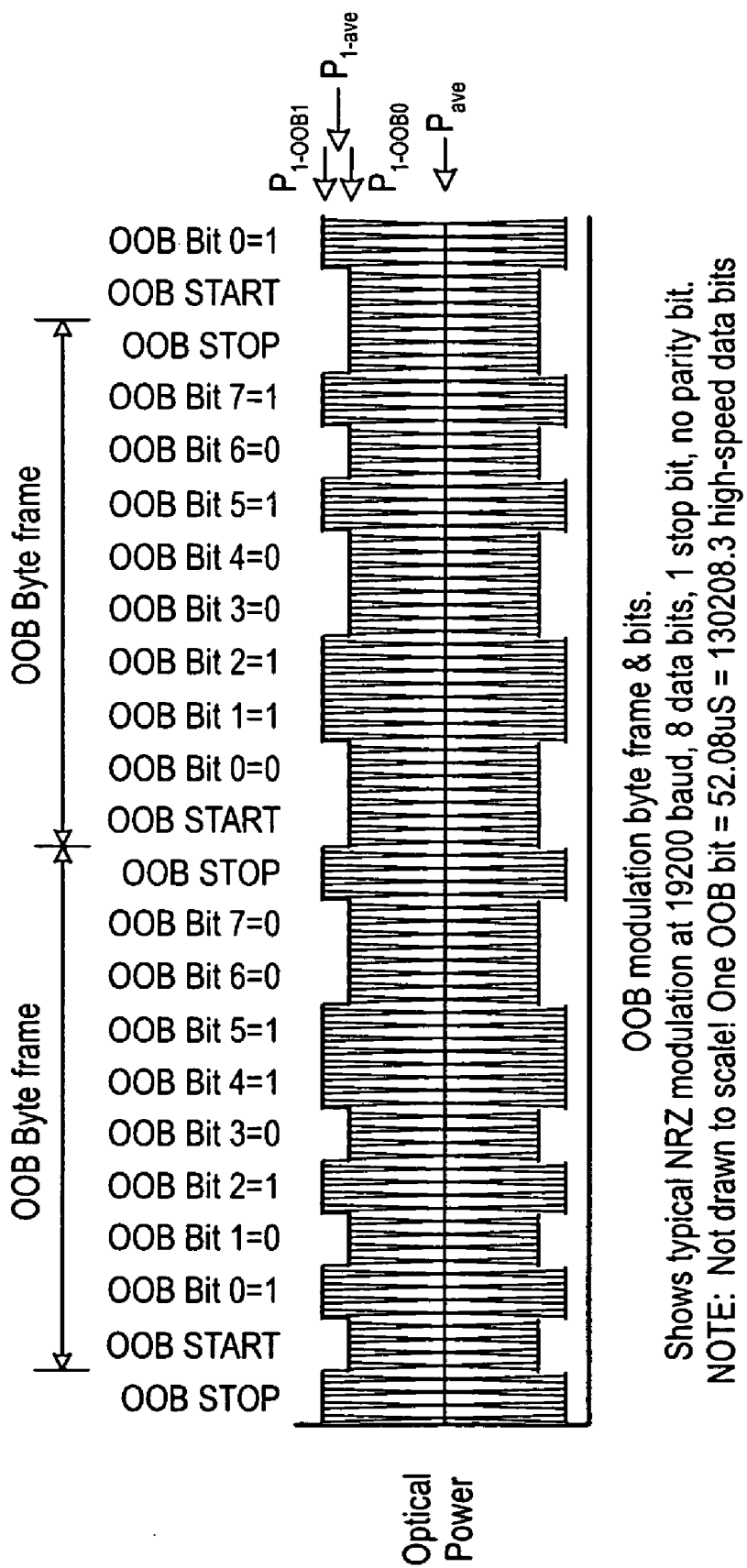
FIG. 2E illustrates a high-speed data signal modulated with out-of-band data where the out-of-band data is modulated on the extinction ration of the high-speed data signal.

In an alternate embodiment of the invention shown in FIGS. 2D and 2E, the out-of-band data is modulated onto the extinction ratio. In this example, the average power remains constant, while the peak power, at both the highest and lowest power outputs, is modulated according to an out-of-band bit stream. FIG. 2D shows that the extinction ratio when a "1" out-of-band bit is being transmitted is greater than when a "0" out-of-band bit is being transmitted. Viewed alternatively as shown in FIG. 2E, when a "1" out-of-band bit is transmitted, the high-speed "1" bits are transmitted with a higher power than when a "0" out-of-band data bit is transmitted. Additionally, when a "1" out-of-band bit is being transmitted, a "0" high-speed bit is transmitted with less power than when a "0" out-of-band bit is being transmitted. Thus the out-of-band data behaves similar to an amplitude modulation of the high-speed data.

Figure 2F:
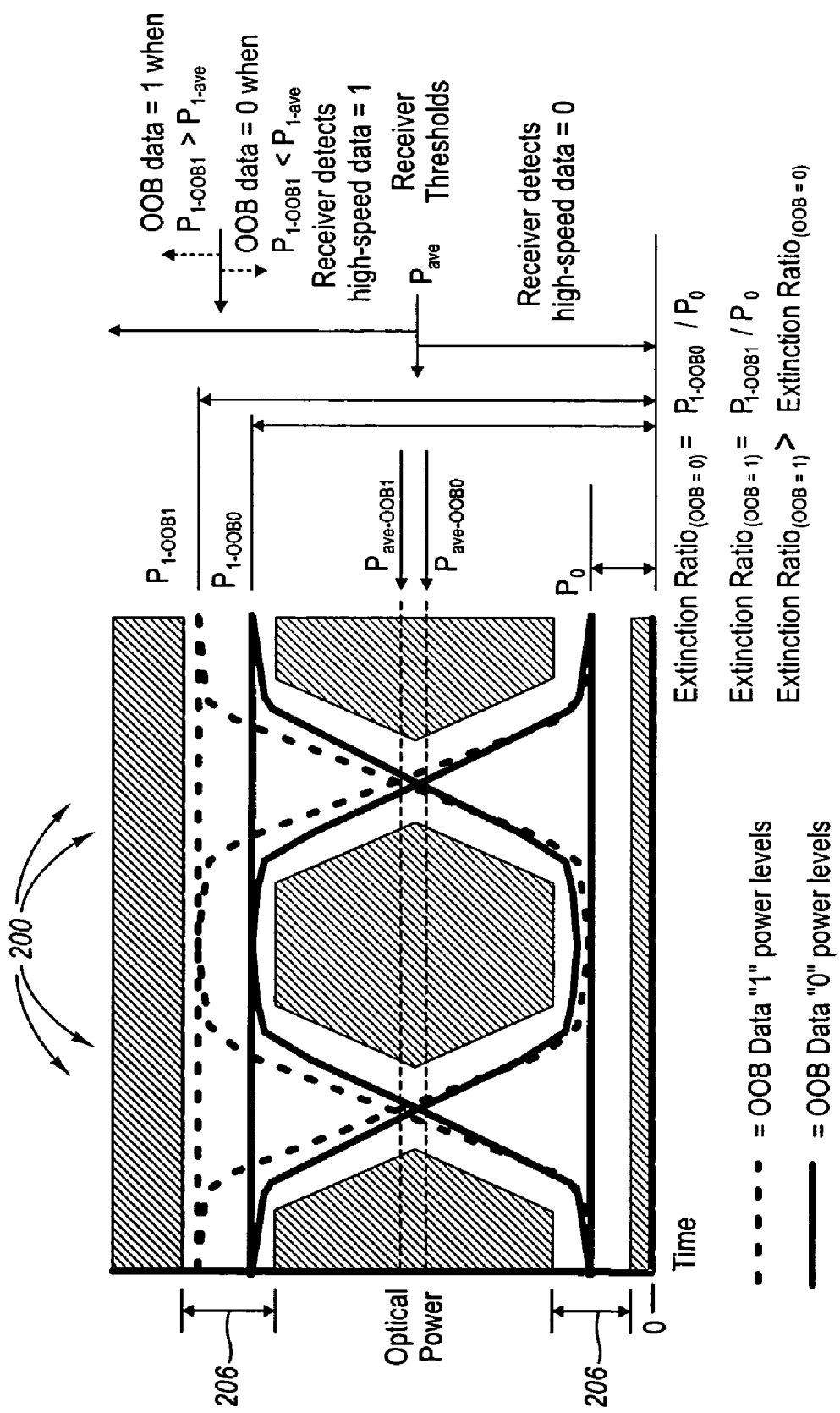
FIG. 2F illustrates an eye diagram showing out-of-band data modulated using peak power.
Figure 2G:
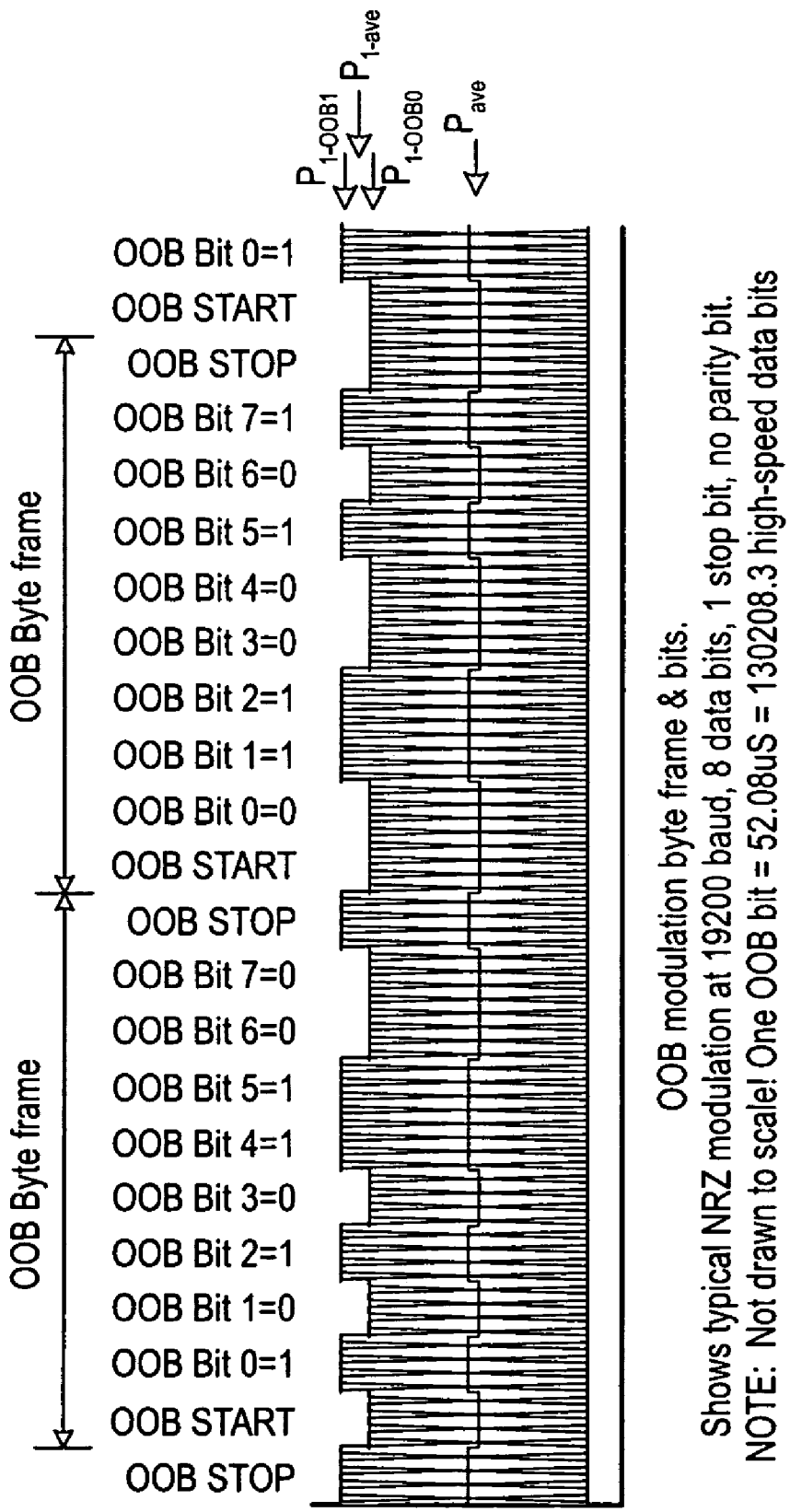
FIG. 2G illustrates a high-speed data signal modulated with out-of-band data where the out-of-band data is modulated on the peak power of the high-speed data signal.

Another embodiment of the invention, as shown in FIGS. 2F and 2G, modulates a combination of the peak power of the high-speed data and the average power of the high-speed data with out-of-band data. In the example shown, the out-of-band bit stream is modulated onto the high-speed "1" bits. Thus in this case, the extinction ratio of the transmitted optical signal is higher when a "1" out-of-band bit is sent than when a "0" out-of-band bit is sent. Viewed differently, the "1" high-speed bits are transmitted with more power when an out-of-band "1" bit is transmitted than when an out-of-band "0" bit is transmitted. This embodiment may help to simplify high-speed data receiver designs.

Referring now to FIGS. 3A and 3B, transmitter designs are illustrated that can be used to modulate the average power of a high-speed data signal with out-of-band data. A transmitter 300 includes a laser driver 302 connected to a laser 304. The laser driver 302 accepts as one input, an extinction ratio command 306. The extinction ratio command 306 controls the extinction ratio of signals transmitted by the transmitter 300. The laser driver 302 further includes a high-speed data input 308, which is a differential input accepting high-speed electrical signals. Using the high-speed data input 308, the laser driver modulates the laser 304 output power.

The transmitter 300 includes various components in a bias circuit for controlling the average power output of the laser 304. The bias circuit includes a transistor 310 that controls a bias current through the laser 304. The transistor 310 is controlled by an amplifier 312. The amplifier 312 has, as one input, the sum of an average power command 314 and an out-of-band data signal 316. The out-of-band data signal 316 causes the average power output of the laser 304 to be modulated according to the out-of-band data signal 316. Modulating using the laser driver 302 and the bias circuit creates a double modulated signal including both high-speed and out-of-band data. In the example shown, the average power command 314 represents 97% of the amplifier 312 input whereas the out-of-band data signal represents 3% of the amplifier 312 input. These are only exemplary numbers and other ratios may be used. The amplifier 312 has as feedback, a signal from a monitor photodiode 318. The monitor photodiode 318 monitors the output power of the laser diode 304 and allows a current to flow through the monitor photodiode 318 that is proportional to laser output power. This current is used to generate a signal that is fed into the amplifier 312 as a feedback signal. In this way, the average power output of the laser 304 can be maintained at a constant level dictated by the combination of the average power command signal 314 and the out-of-band data signal 316.

FIG. 3B illustrates another transmitter that may be used to modulate the average power output of the laser 304 with out-of-band data. The transmitter 320 of FIG. 3B is similar to the transmitter 300 of 3A. However, the transmitter of 3B excludes the monitor photodiode 318 of FIG. 3B. Instead, amplifier 312 receives a feedback signal that is essentially proportional to the current through the laser 304.

Figure 3C:
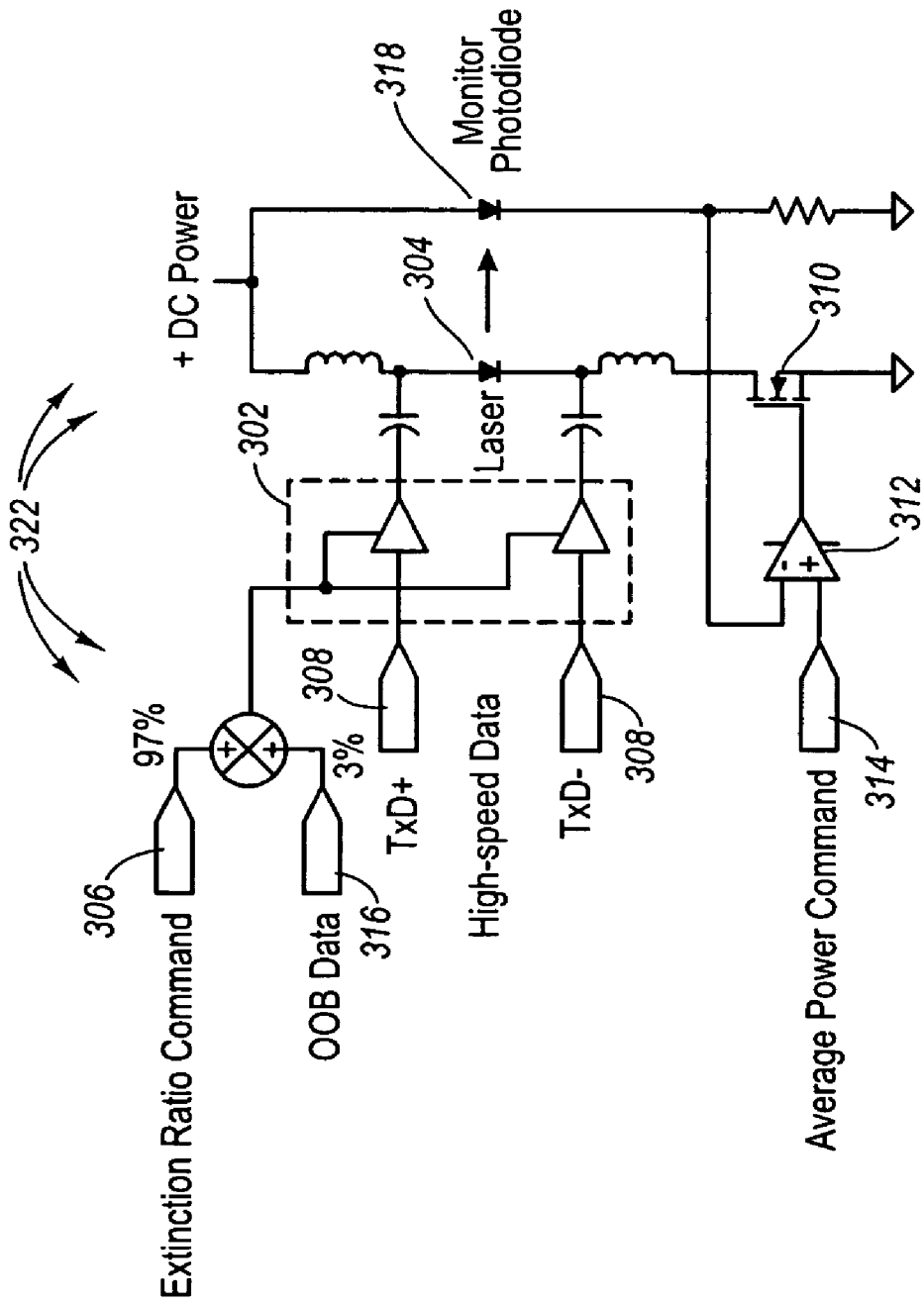
FIG. 3C illustrates an apparatus for modulating out-of-band data onto the extinction ratio of a high-speed data signal.

FIG. 3C illustrates a transmitter 322 that may be used to modulate out-of-band data as a modulation of the extinction ratio such as the modulation shown in FIGS. 2D and 2E. The transmitter 322 includes a laser driver 302 which has as one input the high-speed data signal 308 to modulate the laser 304. Another input into the laser driver is the combination of an extinction ratio command signal 306 and the out-of-band data signal 316. This causes the laser 304 to produce a double modulated optical signal including both the high-speed data and the out-of-band data. The transmitter 322 also includes circuitry to control the average power output of the laser 304 such as the transistor 310, the amplifier 312 and the monitor photodiode 318. As with the embodiment shown in FIG. 3B, the monitor photodiode 318 may be eliminated in favor of other types of average power feedback.

Figures 3D, 3E:
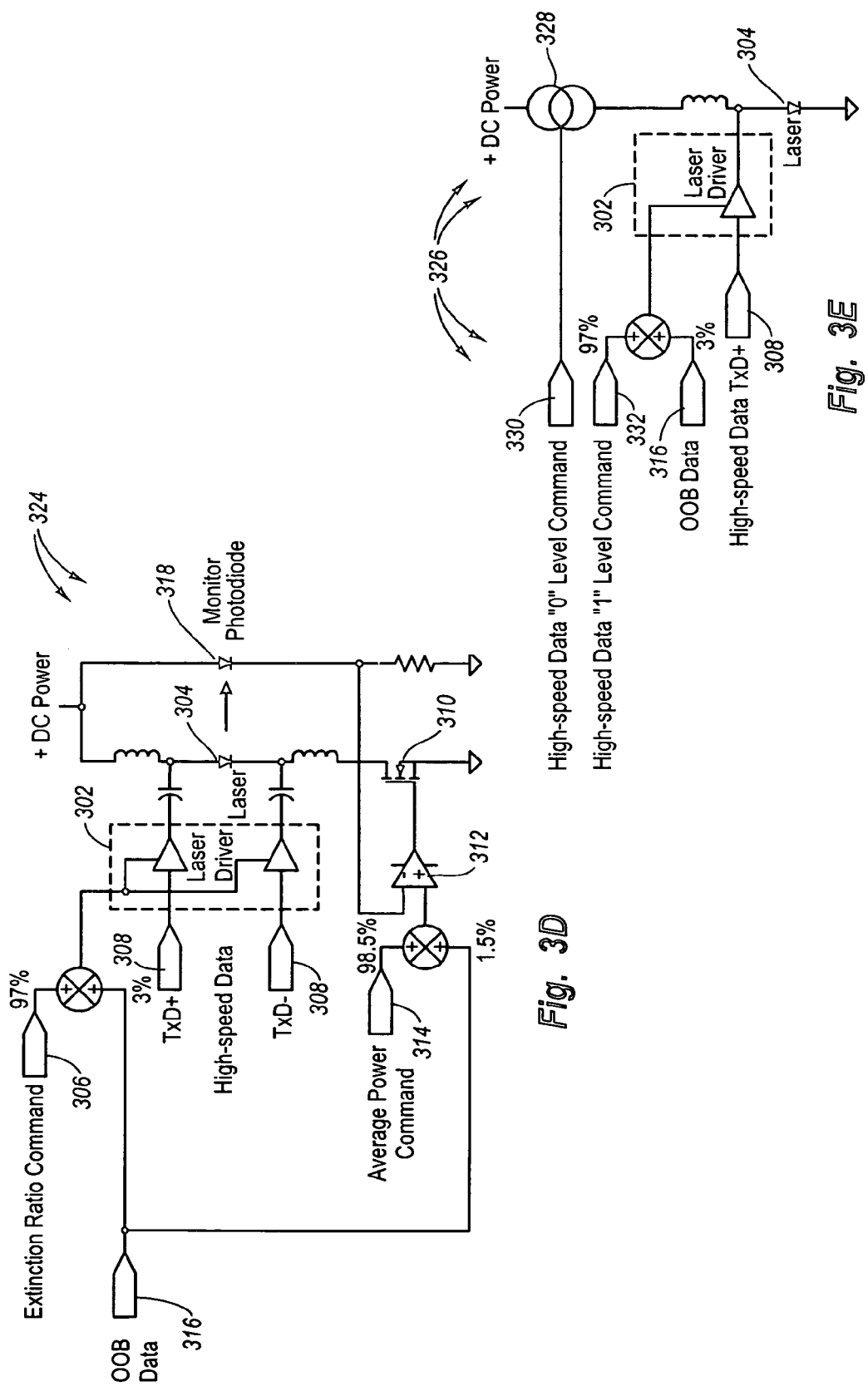
FIG. 3D illustrates an apparatus for modulating out-of-band data onto the peak power of a high-speed data signal.
FIG. 3E illustrates an apparatus for modulating out-of-band data onto the peak power of a high-speed data signal.

FIGS. 3D and 3E illustrate transmitter circuits for modulating a combination of the peak power of the high-speed data and the average power of the high-speed data with out-of-band data such as is illustrated by the modulation shown in FIGS. 2F and 2G. The transmitter 324 shown in FIG. 3D includes a laser driver 302 that has a differential high-speed data input 308 for modulating the laser 304 with high-speed data. The laser driver also has an input that is the combination of an extinction ratio command 306 and an out-of-band data signal 316. The output power of the laser 304 is further modulated by the bias circuitry including the amplifier 312 and transistor 310. The amplifier 312 has as one input a combination of an average power command 314 and the out-of-band data signal 316. The modulation of the out-of-band data signal causes the amplifier 312 and transistor 310 to modulate the average power of the laser 304. Notably, to obtain the modulation shown in FIGS. 2F and 2G, when the modulation at the laser driver has a ratio of 97% extinction ratio command to 3% out-of-band data, the ratio of average power command is 98.5% to 1.5% out-of-band data. As mentioned above, those of skill in the art will recognize that other ratios may be used such as 95% extinction ratio command to 5% out-of-band data when the average power command is 97.5% to 2.5% out-of-band data. Notably, only two examples of ratios have been demonstrated here when in fact multiple other examples are contemplated by embodiments of the invention. The channel margin 206 allows for, in theory, an unlimited number of ratios for each of the embodiments set forth above. In practice, the ratios are limited by the sensitivity of various components within a system.

FIG. 3E illustrates yet another embodiment of a transmitter that modulates a combination of the peak power of the high-speed data and the average power of the high-speed data with out-of-band data such as is illustrated by the modulation shown in FIGS. 2F and 2G. FIG. 3E shows a transmitter 326. The transmitter 326 includes a current source 328 for biasing the laser 304. The current source 328 has as an input a high-speed data "0" level command 330 that defines the amount of current supplied to the laser 304 when a high-speed data "0" bit is to be transmitted. A laser driver 302 is connected to the laser 304. The laser driver receives as one input a high-speed data signal 308 that modulates the laser power according to the high-speed data signal 308. Notably, the laser driver 302 is shown modulating using only a single drive signal. The laser driver 302 will nonetheless receive a differential signal which will be converted by the laser driver 302 to a single drive signal for modulating the laser 304. The laser driver 302 also includes an input that is the combination of a high-speed data "1" level command 332 and the out-of-band data signal 316. The high-speed data "1" level command 332 defines the additional power that is output by the laser 304 when a high-speed data "1" bit is to be transmitted. By combining the high-speed data "1" level command 332 with the out-of-band data signal 316, the out-of-band data is modulated onto the "1" bits of the high-speed data as is shown in FIGS. 2F and 2G.

Some embodiments of the invention further include an encoder for encoding the out-of-band data prior to using the out-of-band data for modulating the laser 304. The encoder may be used to encode the out-of-band data using encoding techniques such as Manchester encoding, phase shift keying and the like.

Figure 4:
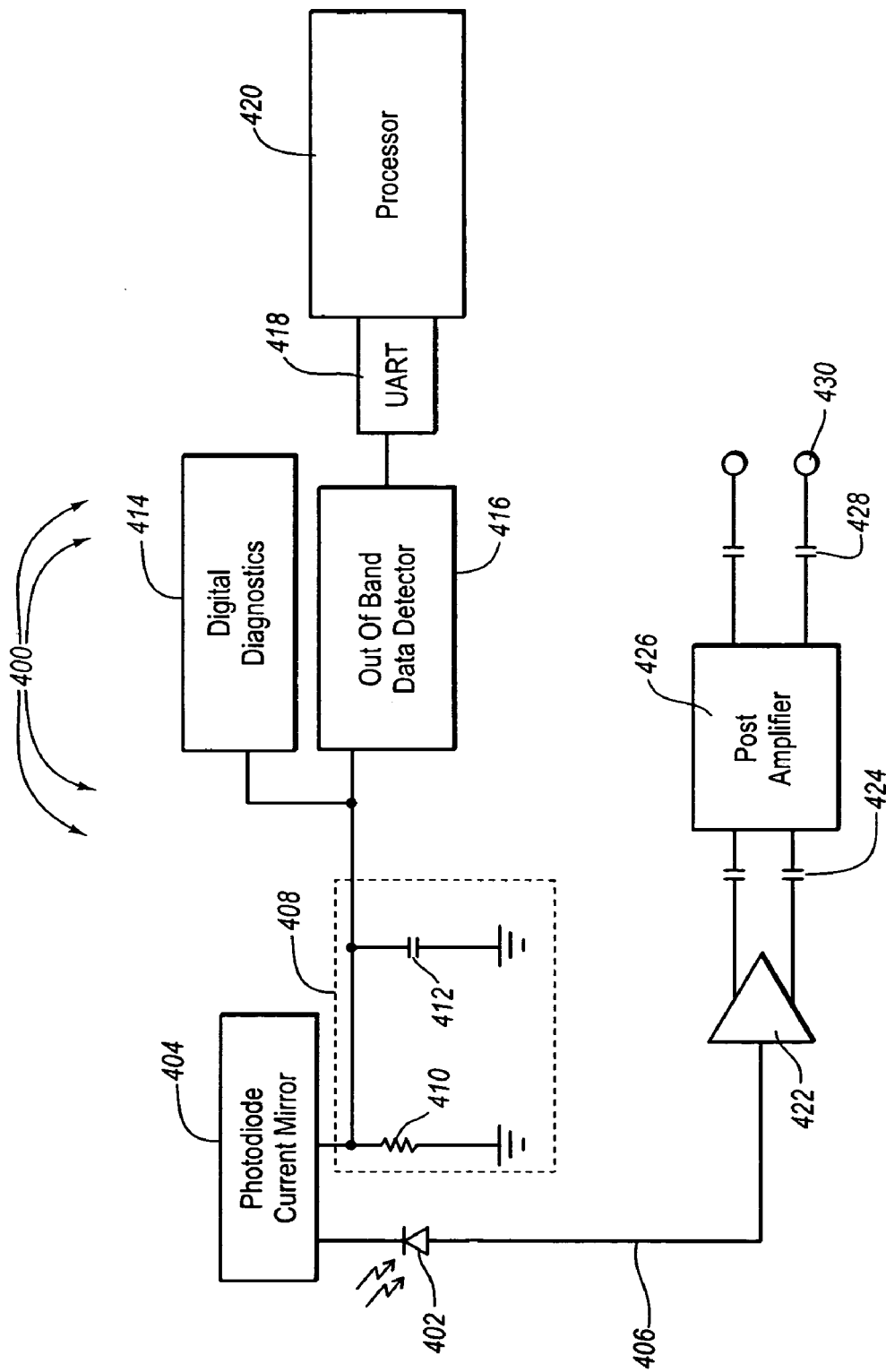
FIG. 4 illustrates an apparatus for receiving a double modulated signal and for extracting high-speed data and out-of-band data from the double modulated signal.

Referring now to FIG. 4, an exemplary receiver for receiving an incoming double modulated signal is shown. Receiver 400, in this example includes a signal reception element that, in this case, is a photodiode 402 for receiving a physical layer signal that is an optical signal, from a physical link. The photodiode 402 converts the physical layer signal into an incoming double modulated electronic signal that in this example is a current through the photodiode 402. The photodiode 402 is connected to a photodiode current monitor 404 that monitors the current through the photodiode 402. The current monitor 404 is connected, in the example shown, to a peak detector 408 that can be used to create a signal that can be fed into digital diagnostics 414 and an out-of-band detector 416. The digital diagnostics 414 monitors at least one of the average power, peak power, extinction ratio of a signal, etc received by the photodiode 402. This information can be used to, among other things, monitor and determine the health of transceivers in a network.

The out-of-band data detector 416 converts the average power, peak power or extinction ratio of the optical signal received at the photodiode 402 into an out-of-band data stream. This out-of-band data stream is fed into a UART 418 and further into a microprocessor 420 for any suitable use of the out-of-band data stream. In embodiments where the out-of-band data has been modulated using modulation techniques such as Manchester encoding, phase shift keying and the like, the out-of-band data detector 416 includes a demodulator to demodulate the out-of-band data.

In one embodiment of the invention, the out-of-band data detector may be a commercial infrared (IR) remote control decoder, such as those typically used in television remote controls or other such equipment. Suitable decoders include receivers such as T2525, T2527 and U2538B, available from Amtel Corporation in San Jose, Calif. IR remote control decoders are especially well adapted to receiving out-of-band data signals. IR remote control decoders are designed to decode signals derived from ambient lighting, such as incandescent and other lights, and modulated IR light signals from a control transmitter, and to extract the modulated control signals from the background noise of the ambient light. This situation is somewhat analogous to embedding a relatively small out-of-band data signal on a much larger high-speed data signal. Thus, the IR remote control decoders may provide a way to implement embodiments of the present invention.

Small currents are caused in the photodiode 402 when optical signals contact the photodiode. These small currents pass through a high-speed data input 406 and are fed into a high-speed data amplifier, which, in this example, is a transconductance amplifier 422. The transconductance amplifier 422 converts the current from the high-speed data input 406 into a differential high-speed data voltage signal. The differential high-speed data voltage signal passes through filtering capacitors 424 to a post amplifier 426. The filtering capacitors 424 remove frequencies below a given threshold such that only high-speed data is transmitted to the post amplifier 426. The post amplifier 426 performs appropriate signal processing of the high-speed data signal. This processed high-speed data signal is then sent through additional filtering capacitors 428 and finally to output terminals 430, where it is available to a device having need of the high-speed data signal, such as a host device.

Figure 5:
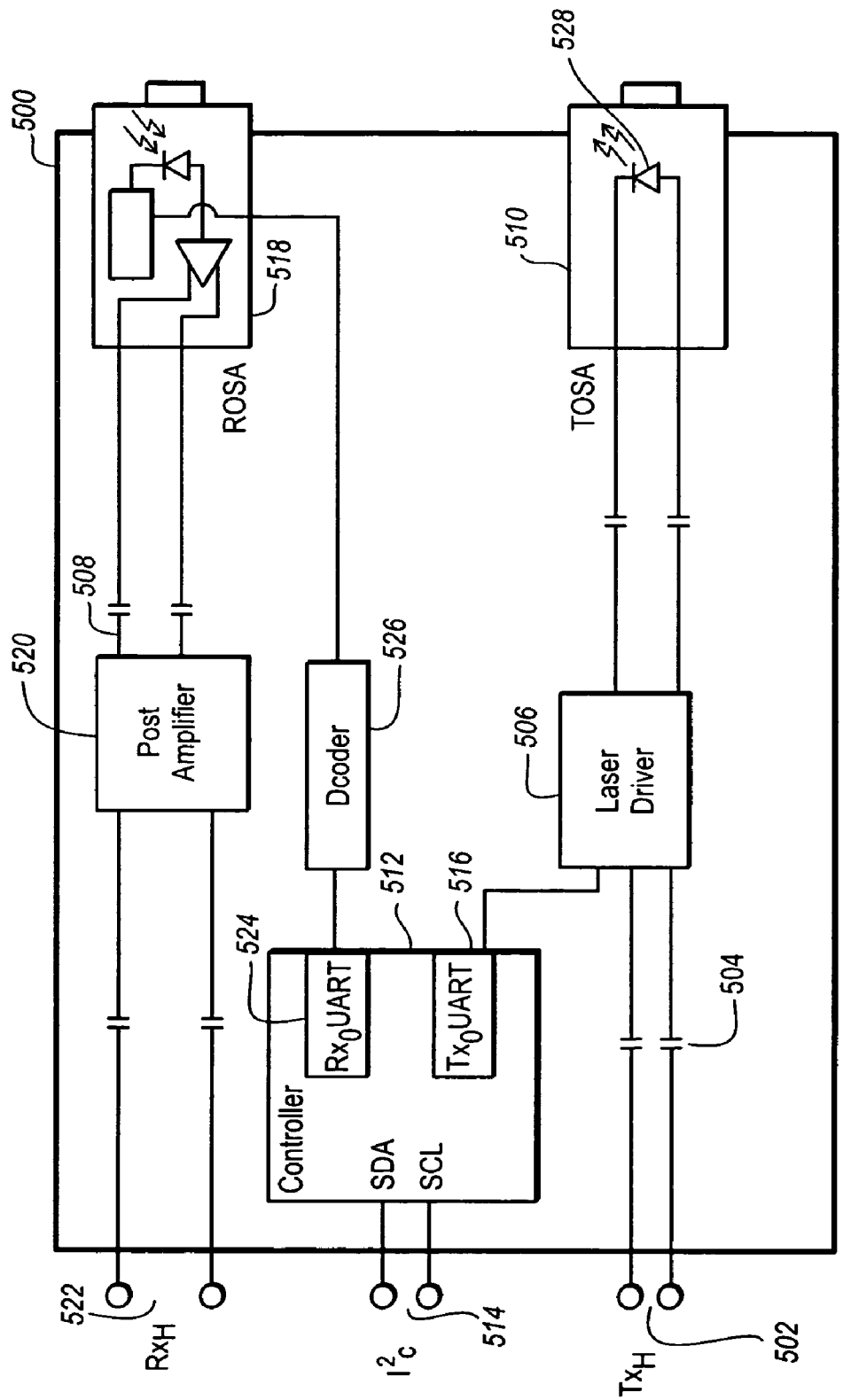
FIG. 5 illustrates a transceiver including hardware for sending and receiving high-speed data and out-of-band data.

Referring now FIG. 5, an embodiment of the invention that includes a transceiver for receiving and transmitting high-speed data and out-of-band data is shown. The transceiver 500 includes a high-speed transmit port 502 for receiving high-speed electronic data. The high-speed electronic data may be received from a host device in which the transceiver 500 is installed. The high-speed electronic data is transmitted through filtering capacitors 504 to a laser driver 506. The laser driver amplifies the high-speed electronic data to produce a driving signal which is then passed to a TOSA 510 that converts the driving signal into optical data. The laser driver 506 is further connected to a controller 512. The controller receives $I^2C$ data at an $I^2C$ port 514. The controller delivers the data received from the $I^2C$ port 514 through an out-of-band transmission UART 516 to the laser driver 506.

Embodiments of the invention also contemplate out-of-band data being produced within the transceiver 500 by the controller chip 512 or other circuitry in the transceiver. For example, the out-of-band data may be digital diagnostic data such as, but not limited to, setup functions, identification information, eye safety and general fault detection, temperature compensation functions, monitoring functions, power on time, margining, and the like. The digital diagnostic data produced by the controller chip may be sent as out-of-band data. Notably, the digital diagnostic data may also be produced, in whole or in part, by the host device and transmitted to the transceiver across the $I^2C$ bus. Thus, out-of-band data may derive from multiple sources including a host device, or directly from functions performed within a transceiver.

The laser driver 506 encodes the out-of-band data received from the $I^2C$ port 514 onto the driving signal for driving the TOSA 510 and ultimately a laser 528 such that out-of-band data is modulated together with a high-speed data signal which is then output as an outgoing double modulated optical signal from the TOSA 510. Optical data is received by the transceiver 500 at the ROSA 518. The optical data may be an incoming double modulated optical signal that includes both high-speed data and out-of-band data. The optical signal is converted to an electronic signal by the ROSA 518. The post amplifier 520 extracts high-speed electronic data which is then fed to a high-speed output port 522 where the high-speed data is made available to a host device in which the transceiver 500 is installed. A decoder 526 extracts out-of-band data from an electronic signal generated by a photodiode current monitor 530 in the ROSA 518 which is then fed into an out-of-band reception UART 524 in the controller 512. The decoder 526 may also include demodulation functionality when the out-of-band data has been modulated using some modulation technique. The out-of-band data, in this example, is modulated at some low frequency. Low frequency as used in this context does not specify any defined bandwidth other than a bandwidth lower than the high-speed data. Bandwidths for the out-of-band data are discussed in more detail below in conjunction with the description of FIG. 7.

Figure 6:
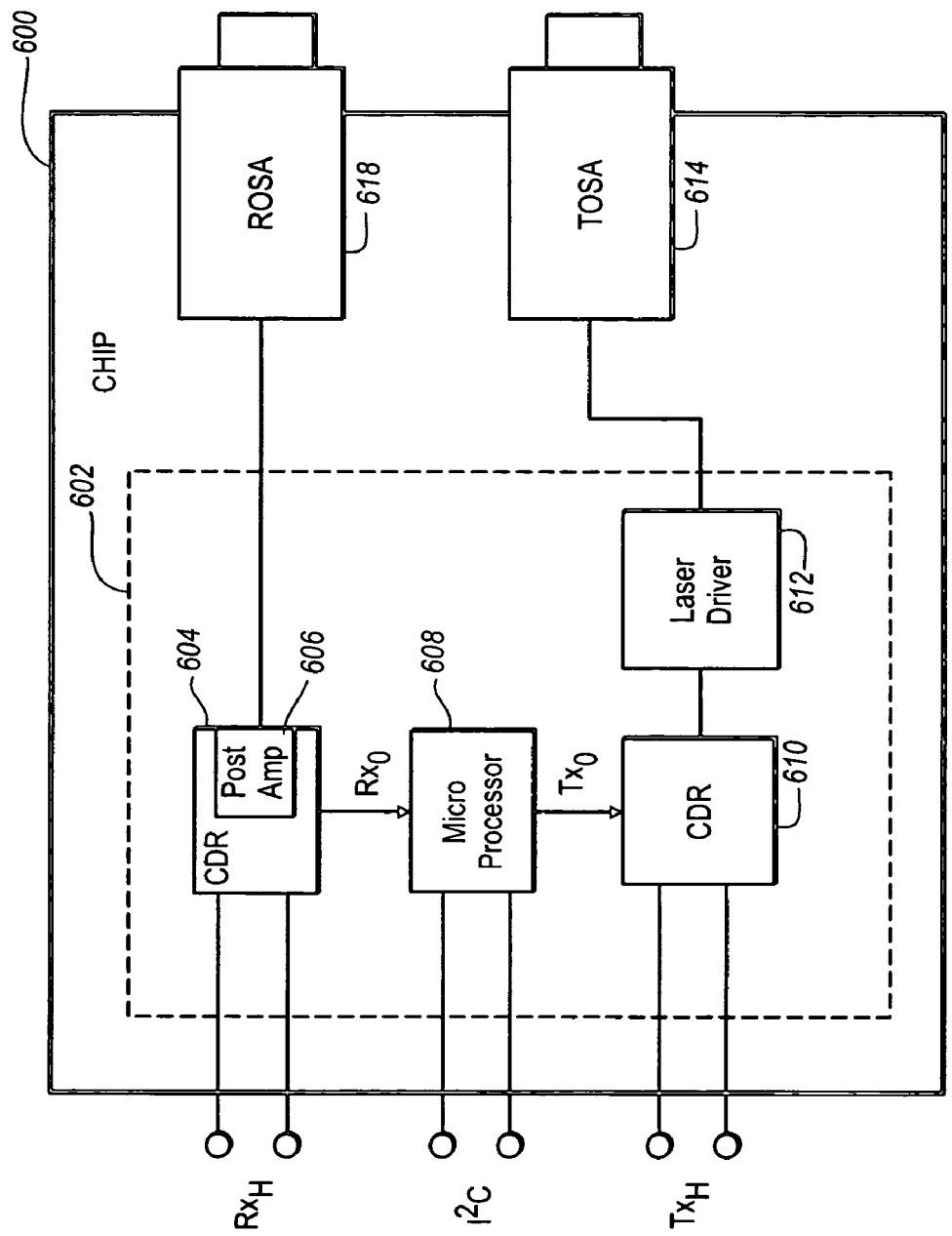
FIG. 6 illustrates an alternate embodiment of a transceiver including an integrated circuit chip that includes various components for sending and receiving high-speed and out-of-band data.

Referring now FIG. 6 an alternate embodiment of a transceiver is shown. The transceiver 600 in FIG. 6 may be, for example, an XFP transceiver. The transceiver 600 is similar to the transceiver 500 shown in FIG. 5 and data communications follow a similar path. The transceiver 600 includes a single chip 602 that includes a clock and data recovery circuit 604. The clock and data recovery circuit 604 also includes a post amplifier 606 for performing digital signal processing on the signals received from the ROSA 618. The clock and data recovery circuit 604 is connected to a microprocessor 608 that receives out-of-band data extracted by the clock and data recovery circuit 604, which also includes circuitry to perform out-of-band data detector functions. On the transmit side of the transceiver 600, the microprocessor 608 is connected to a clock and data recovery circuit for sending out-of-band data.

The clock and data recovery circuit 610 is included in the chip 602. The clock and data recovery circuit 610 is connected to a laser driver 612. In one embodiment of the invention, such as the example shown in FIG. 6, the laser driver 612 is also included on the chip 602. The laser driver 612 is connected to a TOSA 614. The clock and data recovery circuit may include portions of a high-speed data modulator and out-of-band data modulator for driving the laser driver 612. The example shown in FIG. 6 illustrates how various embodiments of the invention may incorporate elements for accomplishing the sending and receiving of the out-of-band data in an integrated single chip. Those skilled in the art appreciate that various combinations of components used for transmitting and receiving out-of-band data may be incorporated on a single chip within the scope of embodiments of the present invention.

Figure 7:
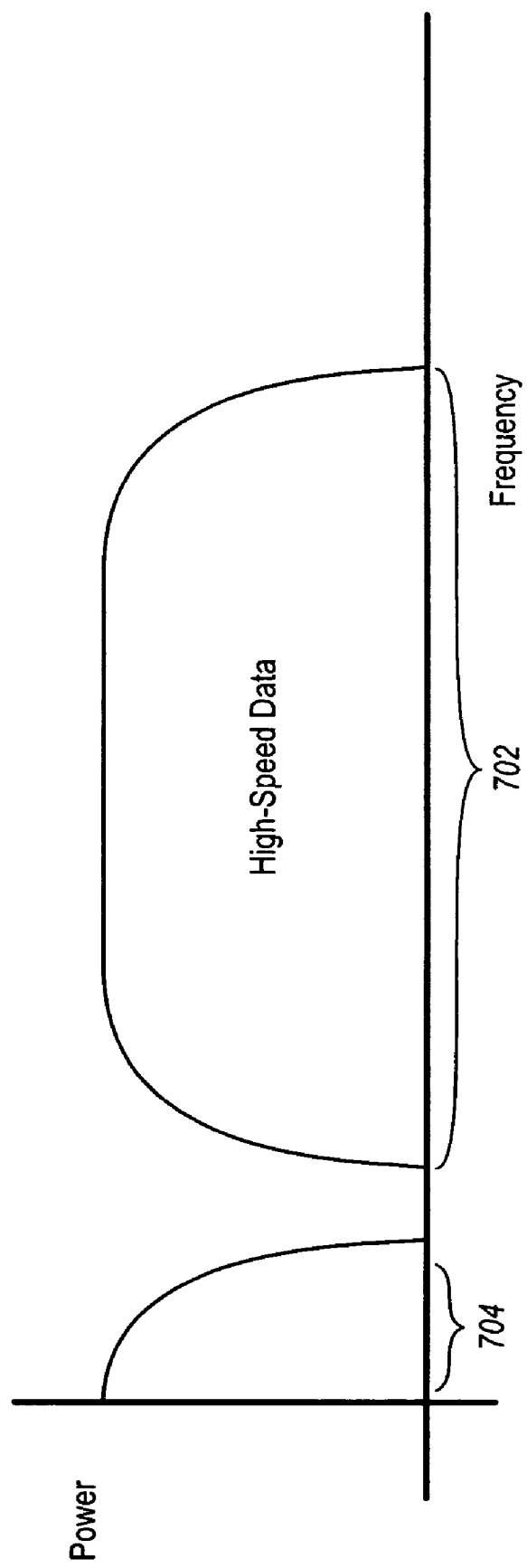
FIG. 7 is a diagram illustrating frequency bandwidths including frequencies at which signals are filtered out of a data link, frequencies at which high-speed data is typically transmitted, and frequencies available for out-of-band data communications.

Referring now to FIG. 7, a graph illustrating how out-of-band digital data may be transmitted across a physical link is shown. The out-of-band data is considered in the context of the frequency response of data on components associated with the transmission of data on the physical link. Ordinarily, high-speed digital data is transmitted within certain frequency parameters or within a certain data frequency bandwidth 702. This is often a function of the frequency, i.e. 1 gigabit, 2 gigabit, 4 gigabit etc, that is specified for a given communications protocol. This may also be a function of filters. As shown in FIGS. 4 and 5, filtering capacitors such as filtering capacitors 424, 428, 504 and 508 are used to filter out low frequency signals. These filtering capacitors, in one embodiment of the invention are designed to filter out frequencies below 30 kHz. High-speed digital data is usually transmitted such that the signal is DC balanced. This is done by transmitting, on the average, an equal number of 1s and 0s. A signal that is DC balanced, in this context, does not have a DC value. This allows the entire signal to pass through filtering capacitors, such as filtering capacitors 504 and 508 shown in FIG. 5. The filtering capacitors block all DC portions of a signal as well as other low frequency signals. Several techniques may be used to DC balance a signal. For example, 8 bits of binary data may be transmitted using a 10 bit word. The extra bits are used to balance the number of 1s and 0s. This type of coding may be used, for example, with 1 to 4 gigabits/second Ethernet and Fiber Channel links. This type of coding usually results in the signal being transmitted at frequencies above 100 Khz. For telecom systems such as SONET or SDH, and 10G Datacom links, scrambling techniques can be used to randomize the bit-stream and thus balance the 1s and 0s. As mentioned above, each of these DC balancing techniques, alone or in combination with filtering, results in the high-speed data being within a high-speed data bandwidth 702.

Out-of-band data can thus be transmitted at frequencies below, or in some embodiments, above the high-speed data bandwidth 702. The data bandwidth for modulating out-of-band data is shown in FIG. 7 as the out-of-band data bandwidth 704. Thus, the out-of-band data resides in the out-of-band data bandwidth 704. To accomplish out-of-band modulation, in one embodiment of the invention, a modulated data signal that has been modulated with high frequency data is further modulated with a data stream of out-of-band data within frequencies within the out-of-band data bandwidth 704.

Figure 8:
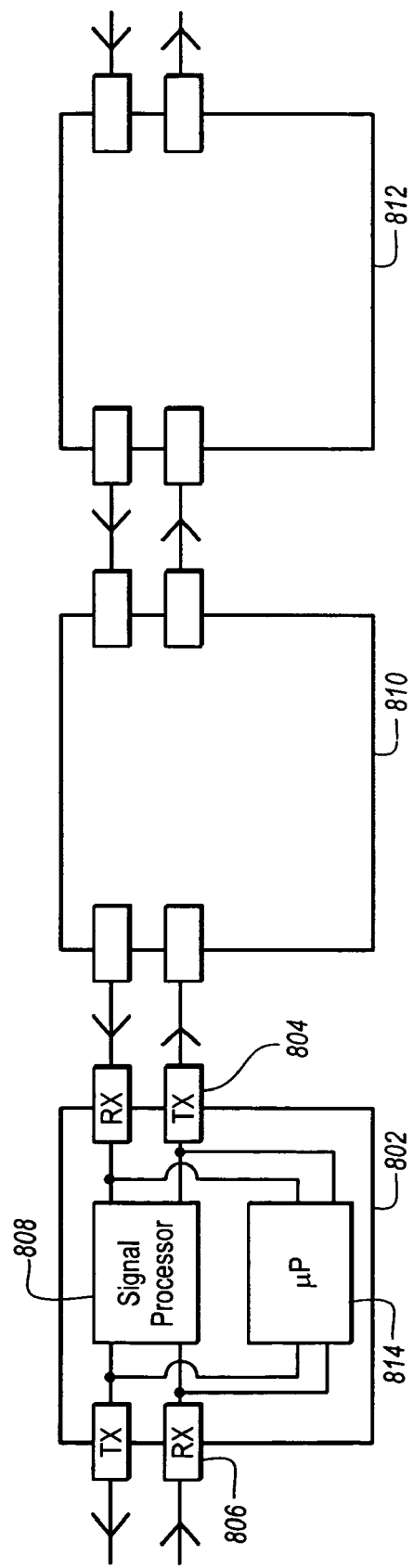
FIG. 8 illustrates a network of repeaters configured to communicate high-speed and out-of-band data.

Referring now to FIG. 8, an embodiment of the invention that allows for transmission of out-of-band data between repeaters in a data transmission range extension embodiment is shown. Some long-haul data transmission applications require that intermediary repeaters be used to ensure that data of suitable quality can be transmitted across the long haul data link. For example, transmission along a fiber-optic cable from one end of the United States to the other end of the United States may require intermediary repeaters to accomplish the transmission with suitable signal quality. FIG. 8 shows a first repeater 802 that includes a TOSA 804 and a ROSA 806. The repeater 802 receives a signal at the ROSA 806. The signal is passed to a signal processor 808 that may perform various digital signal processing tasks, such as removing noise, boosting signal power or other tasks to improve the quality of the signal. The processed signal is then passed to the TOSA 804, where it may be further retransmitted by repeaters 810 and 812. Repeater 802 also includes out-of-band logic such a microprocessor 814 that, among other things, may be used to extract and insert out-of-band data onto the signal sent and received by the repeater 802.

In one exemplary use of the repeater 802, digital diagnostic information for the repeater 802 is sent as out-of-band data through a network of repeaters, such as a network that includes repeaters 802, 810 and 812. The out-of-band data may be concatenated by each of the repeaters in the chain to include digital diagnostic information for each of the repeaters. Thus, the health of repeaters in the communication network can be monitored by a device remote from the repeaters. One example of where this is useful is a network in which a repeater is located in a remote location, such as a rural area, an uninhabited region, or on the ocean floor. When troubleshooting network problems, it may be prohibitively expensive to physically retrieve and test repeaters. However, where diagnostic information for each of the repeaters is included in out-of-band communications, the health and status of the repeater may be monitored remotely such that it is unnecessary to physically retrieve and test the repeater.

In one embodiment of the invention, the out-of-band data that includes digital diagnostic information from each of the repeaters may also be used to monitor the health of fiber optic links between the repeaters. For example, when the digital diagnostic information includes the power of a transmitted signal and the power of a received signal, calculations can be done by subtracting the power received by a receiving repeater from the power sent by a sending repeater to the receiving repeater. Significant power loss may indicate the need to repair or replace a link between repeaters.

In another embodiment of the invention, configuration information may be sent to a remote host, repeater or other device. This helps to avoid the expensive prospect of physically retrieving or being physically in the presence of the device to configure the device. Configuration information may include, for example, instructions for the device to shut off, information designating a communication rate, information indicating that laser power should be reduced or suspended etc.

In other embodiments of the invention, diagnostic information may be requested or automatically sent by a device. In one embodiment, a device can check to insure compatibility with other devices on a network by requesting information such as identification information. In one embodiment the identification information includes information about the manufacturer of a particular device such that a device requesting diagnostic information may be able to determine that the particular device has been qualified for use with the device requesting diagnostic information.

In another embodiment of the invention, diagnostic information such as signal loss across a physical link, can be determined. For example, a device may indicate the power at which a signal is transmitted. A device that receives a signal may indicate in out-of-band data the amount of power received. Thus by comparing the power of the signal sent with the power of the signal received, the loss caused by the physical link between the two devices can be determined.

In yet another embodiment of the invention, security can be maintained between devices in a network by sending identification and authentication information using the out-of-band data. Hardware or software encoded encryption keys exist on devices within the network which can be used to generate identification information or encrypted tokens for presenting to other devices in a network. Thus a secure connection can be implemented between devices were those devices are appropriately matched to one another using hardware embedded encryption keys and the out-of-band data to communicate authentication and identification information.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A transceiver for transmitting diagnostic and/or configuration data, the transceiver comprising:
   a signal power source adapted to produce an outgoing physical layer signal for transmission across a high-speed data interface that is configured to transmit optical data;
   an on transceiver high-speed data modulator that is coupled to the signal power source wherein the signal power source is configured to modulate the outgoing physical layer signal with a high-speed data signal received from the high-speed data modulator;
   an out-of-band data modulator that is coupled to the signal power source wherein the signal power source is configured to modulate the first physical layer signal in response to out-of-band diagnostic and/or configuration data received from the out-of-band data modulator wherein modulation by the signal power source produces a double modulated signal as the outgoing physical layer signal including high-speed data and out-of-band data; and
   a controller configured to generate information regarding the transceiver and to receive host device information from a first host device externally coupled to the transceiver over a low-speed standard bus that is different than the high speed data interface, the low-speed standard bus being a bus for electrical signals, the controller further configured to provide the controller generated information and the host device information to the out-of-band modulator to be modulated as at least some of the out-of band data;
   wherein the transceiver is configured to provide the outgoing physical layer signal including the high-speed data and the out-of-band data that includes the host device information received from the first host device and the transceiver information to a second host device or a second transceiver that is different from the first host device or the transceiver.

2. The transceiver of claim 1, wherein:
   the transceiver is an optical transceiver;
   the signal power source comprises a laser driver and laser; and
   the transceiver further comprises an average power bias circuit configured to control the average power output by the laser, wherein the out-of-band data modulator is coupled to the average power bias circuit.

3. The transceiver of claim 1, wherein:
   the transceiver is an optical transceiver;
   the signal power source comprises a laser driver and laser; and the laser driver further comprises an extinction ratio command input configured to control the extinction ratio of a signal output by the laser, wherein the out-of-band data modulator is coupled to the extinction ratio command input.

4. The transceiver of claim 1, wherein:
the transceiver is an optical transceiver;
the signal power source comprises a laser driver and laser;
the transceiver further comprises an average power bias circuit configured to control the average power output by the laser, wherein the out-of-band data modulator is coupled to the average power bias circuit; and
the laser driver further comprises an extinction ratio command input configured to control the extinction ratio of a signal output by the laser, wherein the out-of-band data modulator is coupled to the extinction ratio command input.

5. The transceiver of claim 1, wherein:
the transceiver is an optical transceiver;
the signal power source comprises a laser driver and laser; and
the laser driver further comprises high-speed data 1 level command that defines the power output by the laser when a high-speed data 1 is output, wherein the out-of-band data modulator is coupled to the high-speed data 1 level command.

6. The transceiver of claim 1, wherein the out-of-band modulator is configured to modulate using at least one of phase shift keying, binary phase shift keying, quadrature phase shift keying, and Manchester encoding.

7. The transceiver of claim 1, further comprising:
a signal reception element configured to receive an incoming physical layer signal across the physical link;
an out-of-band data detector coupled to the signal reception element for extracting out-of-band diagnostic and/or configuration data from the incoming physical layer signal;
a processor configured to receive and provide the extracted diagnostic and/or configuration data to the host device over the standard bus; and
a high-speed data amplifier coupled to the signal reception element, the high-speed data amplifier configured to receive high-speed data carried by the incoming physical layer signal and provide the high-speed data to the externally coupled host device.

8. The transceiver of claim 7, further comprising digital diagnostics configured to monitor and determine the health of the transceiver, wherein the processor is further configured to receive data from the digital diagnostics and to provide the digital diagnostics data to the host device over the standard bus.

9. The transceiver of claim 7, wherein the out-of-band data detector is coupled to the processor through a Universal Asynchronous Receiver-Transmitter (UART).

10. The transceiver of claim 7, further comprising a demodulator coupled to the out-of-band data detector for demodulating the extracted diagnostic and/or configuration data.

11. The transceiver of claim 7, wherein the out-of-band data detector comprises an infrared remote control decoder.

12. A communication device, comprising:
a signal power source adapted to produce a physical layer signal;
a high-speed data modulator that is coupled to the signal power source and operable to modulate the signal power source such that the physical layer signal produced by the signal power source includes high-speed data;
an out-of-band data modulator that is coupled to the signal power source and operable to modulate the signal power source such that the physical layer signal produced by the signal power source is a double modulated signal that includes out-of-band data as well as the high-speed data; and
a controller operable to provide information regarding the communication device and an associated first host device to the out-of-band modulator, wherein the information regarding the associated host is received from the host via a slow-speed standard bus, the information regarding the communication device and the associated host being included in the out-of-band data, wherein the communication device is configured to provide the double modulates signal including the high-speed data and the out-of-band data that includes the host device information received from the first host device and the communication device to a second host device or a second communication device that is different from the first host device or the communication device the communication device configured to provide the double modulated signal via high speed interface that is different from the slow speed standard bus.

13. The communication device according to claim 12, further comprising:
a signal reception element operable to receive a physical layer signal;
an out-of-band data detector coupled to the signal reception element and operable to extract out-of-band data from the physical layer signal; and
a high-speed data amplifier coupled to the signal reception element and operable to extract high-speed data from the physical layer signal and provide the high-speed data to an external device.

* * * * *